US012474880B2

(12) United States Patent
Lee et al.

(10) Patent No.: US 12,474,880 B2
(45) Date of Patent: Nov. 18, 2025

(54) ELECTRONIC DEVICE FOR CONTROLLING EXTERNAL DISPLAY DEVICE, AND OPERATION METHOD THEREOF

(71) Applicant: Samsung Electronics Co., Ltd., Suwon-si (KR)

(72) Inventors: Younglok Lee, Suwon-si (KR); Bongkyu Kim, Suwon-si (KR); Myeongseok Lee, Suwon-si (KR); Sanghun Lee, Suwon-si (KR); Saetbyeol Lee, Suwon-si (KR); Seungbum Lee, Suwon-si (KR); Suji Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/733,277

(22) Filed: Jun. 4, 2024

(65) Prior Publication Data
US 2024/0319947 A1    Sep. 26, 2024

Related U.S. Application Data

(63) Continuation of application No. PCT/KR2022/020040, filed on Dec. 9, 2022.

(30) Foreign Application Priority Data

Feb. 7, 2022    (KR) .................. 10-2022-0015800

(51) Int. Cl.
*G06F 3/14*    (2006.01)
*G06F 3/0482*    (2013.01)
*G06F 3/0484*    (2022.01)

(52) U.S. Cl.
CPC .......... *G06F 3/1423* (2013.01); *G06F 3/0484* (2013.01); *G06F 3/1454* (2013.01); *G06F 3/0482* (2013.01); *G06F 2203/04803* (2013.01)

(58) Field of Classification Search
CPC ....... G06F 3/1454; G06F 3/1423; G09G 5/14; H04M 2250/16
See application file for complete search history.

(56) References Cited

U.S. PATENT DOCUMENTS

2005/0015731 A1*   1/2005   Mak ................. G06F 3/0486
                                                    715/764
2011/0202872 A1    8/2011   Park
(Continued)

FOREIGN PATENT DOCUMENTS

JP    2017-194922 A2    10/2017
KR    10-2011-0093541 A    8/2011
(Continued)

OTHER PUBLICATIONS

International Search Report dated Mar. 20, 2023, issued in International Patent Application No. PCT/KR2022/020040.
(Continued)

*Primary Examiner* — Koosha Sharifi-Tafreshi
(74) *Attorney, Agent, or Firm* — Jefferson IP Law, LLP

(57) ABSTRACT

An electronic device is provided. The electronic device includes a display, a communication circuitry, memory storing one or more computer programs, and one or more processors communicatively coupled to the display, the communication circuitry, and the memory, wherein the one or more computer programs include computer-executable instructions that, when executed by the one or more processors, cause the electronic device to connect to an external display device, display a first screen on the display, transmit, to the external display device, first data related to a second screen differing from the first screen, display a third screen corresponding to the second screen, on at least a portion of the first screen, and, in response to a touch input on the third screen, transmit updated second screen-related second data
(Continued)

to the external display device via the communication circuitry.

20 Claims, 19 Drawing Sheets

(56) References Cited

U.S. PATENT DOCUMENTS

| | | | |
|---|---|---|---|
| 2012/0081353 A1* | 4/2012 | Yusupov | G09G 5/14 345/530 |
| 2013/0125045 A1 | 5/2013 | Sun et al. | |
| 2014/0075377 A1* | 3/2014 | Kang | H04M 1/72409 715/788 |
| 2016/0239250 A1 | 8/2016 | Kim et al. | |
| 2018/0284967 A1* | 10/2018 | Lee | G06F 3/1454 |
| 2019/0278623 A1* | 9/2019 | Kirisken | G06F 9/45558 |
| 2020/0042274 A1* | 2/2020 | Park | G06F 3/1431 |
| 2020/0057596 A1* | 2/2020 | Kim | G06F 3/0482 |
| 2020/0117499 A1* | 4/2020 | Lee | G06F 3/1454 |
| 2020/0142566 A1* | 5/2020 | Kang | G06F 3/1423 |
| 2021/0064191 A1* | 3/2021 | Liao | G06F 3/1454 |
| 2021/0149618 A1 | 5/2021 | Lee et al. | |
| 2021/0181939 A1 | 6/2021 | Lee et al. | |
| 2021/0195285 A1 | 6/2021 | Lee et al. | |
| 2024/0036802 A1* | 2/2024 | Lee | H04N 21/43637 |

FOREIGN PATENT DOCUMENTS

| | | |
|---|---|---|
| KR | 10-2013-0054042 A | 5/2013 |
| KR | 10-2013-0126430 A | 11/2013 |
| KR | 10-2014-0034100 A | 3/2014 |
| KR | 10-2016-0101600 A | 8/2016 |
| KR | 10-2017-0013738 A | 2/2017 |
| KR | 10-2017-0033699 A | 3/2017 |
| KR | 10-2017-0091303 A | 8/2017 |
| KR | 10-2018-0052302 A | 5/2018 |
| KR | 10-2018-0095399 A | 8/2018 |
| KR | 10-2019-0045512 A | 5/2019 |
| KR | 10-2020-0014128 A | 2/2020 |
| KR | 10-2021-0061199 A | 5/2021 |
| KR | 10-2021-0074877 A | 6/2021 |
| KR | 10-2021-0081182 A | 7/2021 |
| WO | 2022/019413 A1 | 1/2022 |

OTHER PUBLICATIONS

Extended European Search Report dated Apr. 7, 2025, issued in counterpart European Application No. 22925112.9.

* cited by examiner

ELECTRONIC DEVICE FOR CONTROLLING EXTERNAL DISPLAY DEVICE, AND OPERATION METHOD THEREOF

CROSS-REFERENCE TO RELATED APPLICATION(S)

This application is a continuation application, claiming priority under § 365(c), of an International application No. PCT/KR2022/020040, filed on Dec. 9, 2022, which is based on and claims the benefit of a Korean patent application number 10-2022-0015800, filed on Feb. 7, 2022, in the Korean Intellectual Property Office, the disclosure of which is incorporated by reference herein in its entirety.

BACKGROUND

1. Field

The disclosure relates to an electronic device for controlling an external display device and an operation method thereof.

2. Description of Related Art

As the processing speed of processors and mobile communication networks of electronic devices, such as smartphones, increases, smartphones equipped with various open operating systems and new services are emerging. As the performance of smartphones improves to a level similar to that of computers, the frequency of use of smartphones has also increased compared to devices, such as desktops (e.g., personal computers (PCs), laptops, or desktop computers). Accordingly, smartphone users store and use various files in smartphones rather than in desktops.

In addition, as the demand for viewing a variety of content on electronic devices increases, the use of services using technology to wirelessly connect electronic devices and external display devices (e.g., a television (TV) and a monitor) is increasing to overcome screen size limitations of the electronic devices. For example, a user may share a screen displayed on an electronic device by displaying same on a screen of an external display device connected to the electronic device.

As such, depending on the needs of users, various technologies enabling the use of electronic devices via connection to external display devices are being developed. Such a service is provided under a name, such as Miracast, screen mirroring, or wireless display (WiDi), depending on manufacturers of electronic devices.

The above information is presented as background information only to assist with an understanding of the disclosure. No determination has been made, and no assertion is made, as to whether any of the above might be applicable as prior art with regard to the disclosure.

SUMMARY

An electronic device outputs content by mirroring the same to an external display device in real time, and thus a user may view the content on the electronic device via the external display device (e.g., a TV or a monitor) which provides a wider screen.

In this way, the same screen may be shared between an external display device and an electronic device via mirroring, or content of the electronic device may be displayed via an external display. However, when a user input of controlling an application or a screen being displayed in the external display device is generated, a signal for the user input may be processed in the electronic device. Therefore, when a screen is displayed via an external display, and controlling of the screen is performed via an electronic device, there is a need to develop a control function between the electronic device and the external display device in a form capable of improving convenience of users.

Aspects of the disclosure are to address at least the above-mentioned problems and/or disadvantages and to provide at least the advantages described below. Accordingly, an aspect of the disclosure is to provide an electronic device for controlling an external display device and an operation method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a display, communication circuitry, memory storing one or more computer programs, and one or more processors communicatively coupled to the display, the communication circuitry, and the memory, wherein the one or more computer programs include computer-executable instructions that, when executed by the one or more processors, cause the electronic device to connect to an external display device, display a first screen on the display, transmit, to the external display device, first data related to a second screen differing from the first screen, display a third screen corresponding to the second screen, on at least a part of the first screen, and in response to a touch input on the third screen, transmit updated second screen-related second data to the external display device via the communication circuitry.

In accordance with another aspect of the disclosure, one or more non-transitory computer-readable storage media storing computer-executable instructions that, when executed by one or more processors of an electronic device, cause the electronic device to perform operations are provided. The operations include performing connection to an external display device, displaying a first screen on a display of the electronic device, transmitting, to the external display device, first data related to a second screen differing from the first screen, displaying a third screen corresponding to the second screen, on at least a part of the first screen, and in response to a touch input on the third screen, transmitting updated second screen-related second data to the external display device.

In accordance with another aspect of the disclosure, a method of operating an electronic device is provided. The method includes performing connection to an external display device, displaying a first screen on a display of the electronic device, transmitting, to the external display device, first data related to a second screen differing from the first screen, displaying, on at least a part of the first screen, a third screen corresponding to the second screen, and in response to a touch input on the third screen, transmitting updated second screen-related second data to the external display device.

According to various embodiments of the disclosure, an electronic device can easily control, via a touch input, a screen displayed on an external display device that performs screen mirroring.

According to various embodiments of the disclosure, when a screen is shared from an electronic device to an external display device via screen mirroring, a user can freely control a screen of the external display device via the screen displayed on the electronic device.

According to various embodiments of the disclosure, when an electronic device outputs execution screens of multiple applications via an external display device, a malfunction of switching between the applications and an input malfunction can be prevented by providing items to control the screens displayed on the external display device.

According to various embodiments of the disclosure, an electronic device provides an optimized control screen corresponding to a screen on an external display device, thereby enabling a user to easily control the screen on the external display device via an intuitive touch input, so that usability for the user can be greatly improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
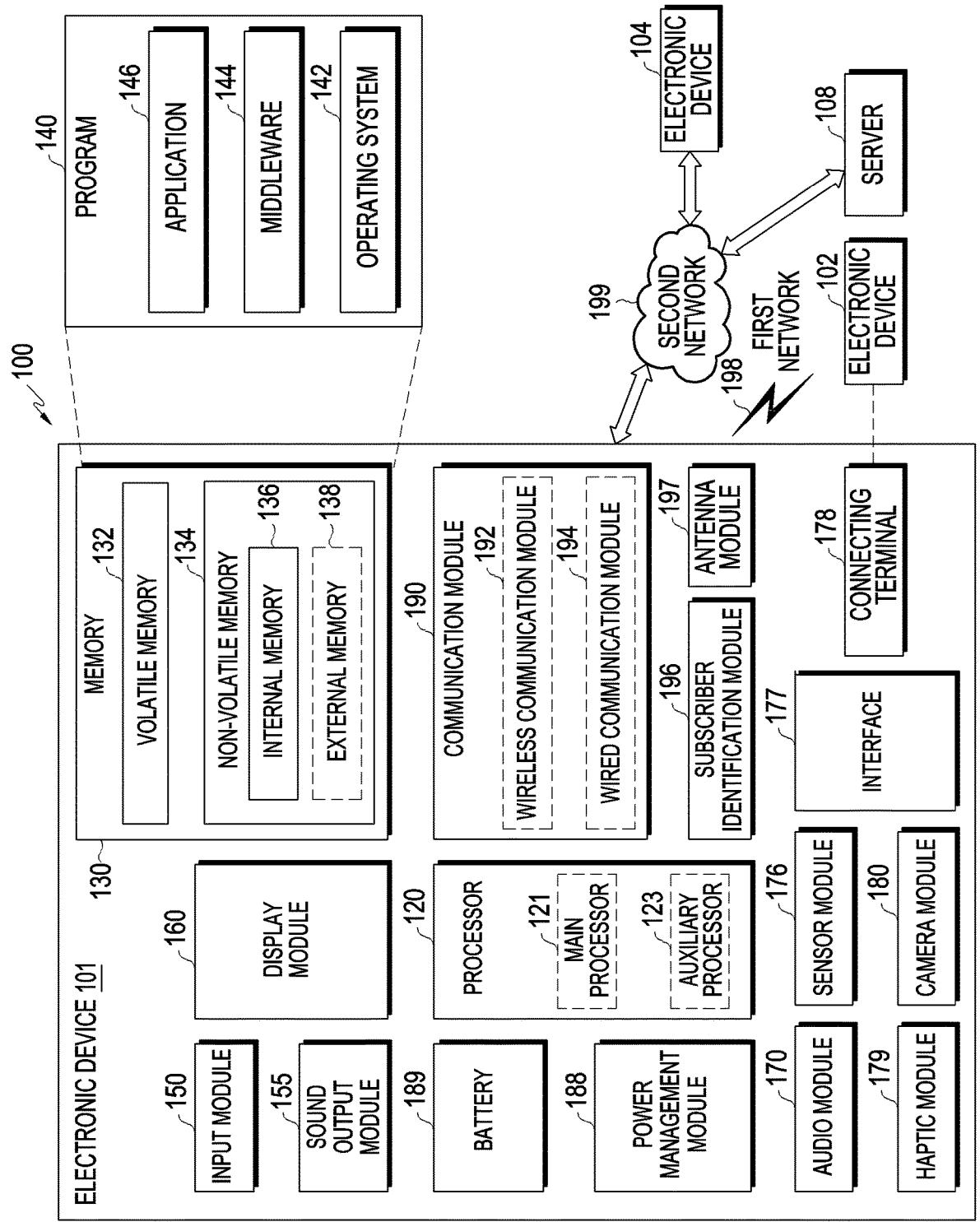
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication.

According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5$^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102 or 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
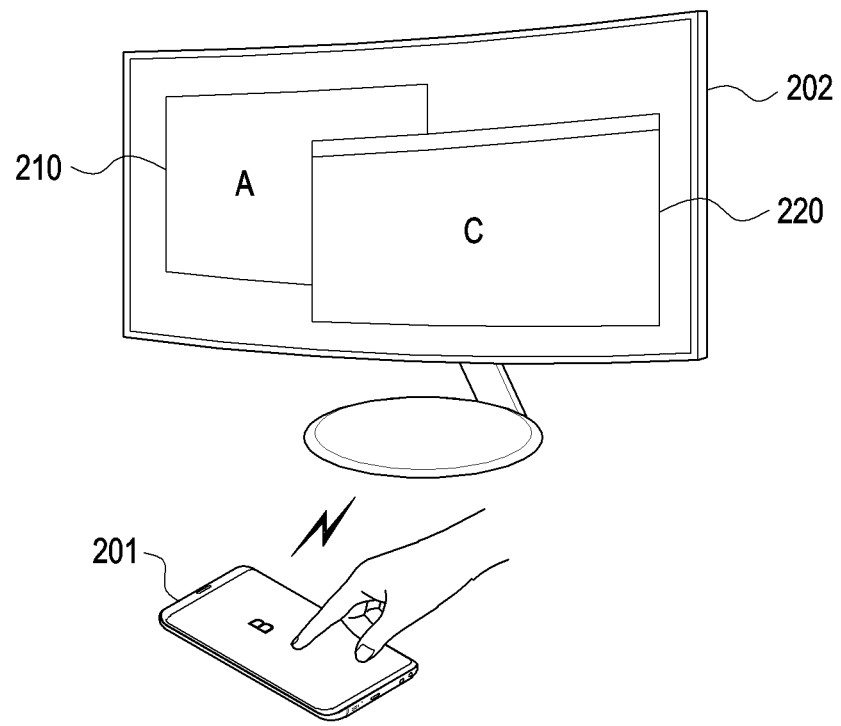
FIG. 2 is a diagram for illustrating a connection relationship between an electronic device and an external display device according to an embodiment of the disclosure.

FIG. 2 is a diagram for illustrating a connection relationship between an electronic device and an external display device according to an embodiment of the disclosure.

Referring to FIG. 2, according to various embodiments of the disclosure, when an electronic device 201 is connected to an external display device 202, an operation for outputting data (e.g., content, screen data) of the electronic device 201 via a screen of the external display device 202 may be performed. Hereinafter, descriptions will be provided by taking an example of a case where the electronic device 201 establishes a communication channel to transmit data to and receive data from the external display device 202 by using a communication module (e.g., the communication module 190 of FIG. 1), but data may be transmitted and received via a wired connection.

Among various communication schemes, a Miracast communication scheme may be a scheme in which a source device (e.g., the electronic device 201) which transmits content is connected wirelessly to a sink device (e.g., the external display device 202) which receives content. Content being displayed on a display of the source device which supports a Miracast communication scheme may be mirrored and output in real time on a display of the sink device. For example, a video and/or audio format (e.g., 1920×1080, 30 fps) may be determined according to a codec configuration between the source device and the sink device.

In addition, when a user input (e.g., a touch input or a key input) for controlling of a screen or an application occurs in the sink device, a signal relating to the input may be transferred to the source device, based on a user input back channel (UIBC), so as to be executed in the source device.

Among various communication schemes, a dex communication scheme may enable, when a dex-related application is executed via a launcher, the electronic device 201 to output a screen of a virtual display via the external display device 202. For example, the electronic device 201 may reconfigure a screen displayed on the display of the electronic device 201 and output the reconfigured screen via the external display device 202. The electronic device 201 may provide a user with a user experience or a user interface similar to that of using a desktop via the external display device 202.

Among various communication schemes, an AppCast communication scheme may be a scheme in which the source device executes an application via a virtual machine and transfers a screen of a virtual display to the sink device. The AppCast communication scheme may support a mode in which a screen of the source device (e.g., the electronic device 201) is displayed as it is on the display of the sink device (e.g., the external display device 202) and a mode in which only a screen of a virtual display of the source device is displayed on the display of the sink device while a screen of the source device (e.g., the electronic device 201) is not displayed on the display of the sink device (e.g., the external display device 202), and may enable switching between the modes.

For example, as illustrated in FIG. 2, while screen B is being displayed on the electronic device 201, screen A (or data related to screen A) of application A via a virtual display may be transferred to the external display device 202, and screen A 210 may be displayed on a display of the external display device 202. In addition, while screen B is being displayed on the electronic device 201, screens A and C of two or more applications (e.g., applications A and C) via a virtual display may be transferred, and screen A 210 and screen C 220 may be displayed together on the display of the external display device 202. In this case, when real-time mirroring is performed in the electronic device 201, screen B of the electronic device 201 may not be displayed on the display of the external display device 202. In the following description, a screen (e.g., screen B) on the electronic device 201, which is not a screen via a virtual display, may be referred to as a built-in display screen.

However, in the case of the AppCast communication scheme, unlike general mirroring in which the electronic device 201 transfers a built-in display screen, as it is, to the external display device 202, when a screen of a virtual display is transferred to the external display device 202, an operation of switching the virtual display to a built-in display may be additionally required. Since control (e.g., a user input) of a virtual display screen operates based on the built-in display scheme, an operation of switching back to the virtual display scheme may be required after the control. Therefore, frequent switching between the built-in display scheme and the virtual display scheme may reduce usability, and depending on a state of a running application, there may occur a situation where an aspect ratio is not adjusted or media being reproduced is paused.

In addition, in the case of the dex communication scheme, since a virtual display transferred to the external display device 202 and a built-in display screen of the electronic device 201 are different from each other, when a control image (e.g., a touch pad) is provided within the built-in display, and control is performed by moving a mouse on the screen (e.g., the virtual display screen) of the external display device 202, there is inconvenience in use compared to an intuitive touch input.

Therefore, in controlling of a screen on the external display device 202, there is a need to develop a control function between the electronic device 201 and the external display device 202 in a form that can improve user convenience.

Hereinafter, various embodiments of the disclosure may provide a method by which, when outputting a virtual display screen of the electronic device 201 via the external display device 202, the electronic device 201 may easily control a screen of the external display device 202, based on an intuitive touch input.

In various embodiments of the disclosure, "the electronic device controls a screen of the external display device" is an expression for convenience of description, and does not indicate that the electronic device 201 only directly controls the screen of the external display device 202. For example, the electronic device 201 may control a virtual display device and/or a virtual display screen. In addition/alternatively, the electronic device 201 may control screen data being transmitted to the external display device 202. Via this, the electronic device 201 may control the screen of the external display device 202.

Figure 3:
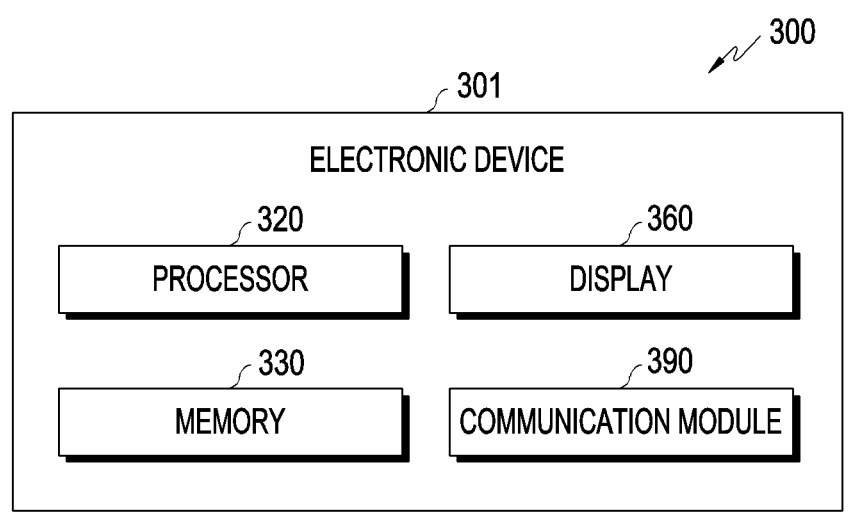
FIG. 3 is an internal block diagram of an electronic device for controlling an external display device according to an embodiment of the disclosure.

FIG. 3 is an internal block diagram 300 of an electronic device for controlling an external display device according to an embodiment of the disclosure.

Referring to FIG. 3, an electronic device 301 (e.g., the electronic device 101 of FIG. 1) according to various embodiments may include a processor 320 (e.g., the processor 120 of FIG. 1), memory 330 (e.g., the memory 130 of FIG. 1), a display 360 (e.g., the display module 160 of FIG. 1), and a communication module 390 (or communication circuitry) (e.g., the communication module 190 of FIG. 1). Here, not all elements illustrated in FIG. 3 are essential elements of the electronic device 301, and the electronic device 301 may be implemented with more or fewer elements than those illustrated in FIG. 3.

The communication module 390 may be communicatively connected to the external display device 202. According to an embodiment of the disclosure, the communication module 390 may be wirelessly connected to the external display device 202 via Miracast scheme communication. Content, such as an image and text output via the display 360 of the electronic device 301, may be output on the display of the external display device 202 in real time via the communication module 390. In addition, content which is not output via the display 360 of the electronic device 301 but is output via a virtual display of the electronic device 301 may also be output on the display of the external display device 202. In this way, among devices communicating in the Miracast scheme, a device which provides content may be referred to as a source device, and a device which receives content may be referred to as a sink device. Hereinafter, descriptions are provided based on that the electronic device 301 is a source device, and the external display device 202 is a sink device, but the disclosure is not limited thereto.

According to various embodiments of the disclosure, the processor 320 may generate a virtual display corresponding to the display of the external display device 202. In addition, the processor 320 may transmit data related to the virtual display to the external display device 202 via the communication module 390 so that the data is output on the display of the external display device 202. For example, when the processor 320 transmits (or mirrors) the data related to the virtual display to the external display device 202, a virtual display screen may not be displayed on the display 360, and a built-in display screen may be displayed on the display 360. Accordingly, the screen displayed via the external display device 202 and the screen displayed via the electronic device 301 may be different from each other.

According to various embodiments of the disclosure, the processor 320 may support a function of controlling, by the electronic device 301, a screen (e.g., a virtual display screen) displayed on the external display device 202. According to an embodiment of the disclosure, the processor 320 may receive, from a user in response to a user input, a request to control a screen corresponding to a virtual display displayed on the display of the external display device 202.

According to various embodiments of the disclosure, the processor 320 may generate a control screen showing (or displaying) a virtual display screen in response to the request. The control screen is a screen corresponding to the screen displayed on the external display device 202, and may be overlappingly displayed in at least a part of the display 360. For example, in order to control the screen of the external display device 202, the processor 320 may display the control screen, which occupies the full screen or a partial area of the screen (e.g., a built-in display screen) output via the display 360 of the electronic device 301, in the form of a window (e.g., a touch view).

Therefore, when a user touches the control screen on the electronic device 301, the electronic device 301 may perform the same function as that for touching a corresponding screen part on the external display device 202. The function of the control screen may be enabled or disabled according to a user configuration, and when the function of the control screen is enabled during mirroring, the control screen may be displayed on the display 360. In this case, a size of the control screen may be changeable according to a user configuration, and adjustment of the size may not affect the screen displayed on the external display device 202. For example, when the function of the control screen is disabled, the screen of the external display device 202 may be output by mirroring a virtual display screen of the electronic device 301 as it is, and when the function of the control screen is enabled, a screen resolution (or image quality) of the external display device 202 may not be changed even if the size of the control screen increases or decreases according to the user configuration.

According to various embodiments of the disclosure, the processor 320 may identify whether an input event by a user touch occurs within the control screen. When the input event occurs, the processor 320 may control the input event to be processed within the virtual display. As described above, the processor 320 may display the control screen to receive a user touch input. In addition, the input event via the control screen may be processed based on the virtual display screen that is the same as the screen of the external display device 202 in order to perform the same function as an operation on the screen of the external display device 202. To this end, an aspect ratio of the control screen and that of the virtual display may be kept the same, and the size of the control screen may be adjustable using scale values (e.g., scaleX and scaleY) for the resolution of the virtual display. For example, when it is assumed that the resolution of the virtual display is a first resolution (e.g., 1920×1080), and the scale values are scaleX=0.5 and scaleY=0.5, the resolution of the control screen may be a second resolution (e.g., 960×540). In this case, since coordinates of the control screen and coordinates of the virtual display are different from each other, the processor 320 may transform the coordinates of the control screen into the coordinates of the virtual display according to the scale values.

Accordingly, the processor 320 may provide the transformed coordinates to the virtual display, and perform control so that a function corresponding to a position, at which the input event has occurred, within the virtual display screen is performed. The processor 320 may transmit a screen (or updated screen), which changes according to performing of the function corresponding to the input event occurrence position, and related data to the external display device 202, thereby enabling the updated screen to be output in real time via the display of the external display device 202. Therefore, the electronic device 201 may provide the control screen which enables a touch input of the user on the built-in display screen, thereby intuitively controlling the screen on the external display device 202.

The memory 330 may store instructions for, when executed, controlling the processor 320 to perform various operations.

According to various embodiments of the disclosure, the memory 330 may be operatively connected to the display 360, the communication module 390 (or communication circuitry), and the processor 320, and may store instructions configured to perform connection to the external display device 202, display a first screen (e.g., a built-in display screen) on the display 360, transmit, to the external display device 202, first data related to a second screen (e.g., a virtual display screen) differing from the first screen, display, on at least a part of the first screen, a third screen (e.g., a control screen (or touch view)) corresponding to the second screen, and in response to a touch input on the third screen, transmit updated second screen-related second data to the external display device 202 via the communication module 390.

According to various embodiments of the disclosure, the electronic device 301 may include the display 360, communication circuitry (or the communication module 390), memory storing one or more computer programs, and one or more processors 320 communicatively coupled to the display, the communication module, and the memory, wherein the one or more computer programs include computer-executable instructions that, when executed by the one or more processors 320, cause the electronic device to perform connection to the external display device 202, display a first screen on the display 360, transmit, to the external display device 202, first data related to a second screen differing from the first screen, display, on at least a part of the first screen, a third screen corresponding to the second screen, and in response to a touch input on the third screen, transmit updated second screen-related second data to the external display device 202 via the communication module 390.

According to various embodiments of the disclosure, the first screen may include an object for displaying the third screen, and the one or more computer programs further include computer-executable instructions that, when executed by the one or more processors, cause the electronic device to display the third screen corresponding to the second screen, on at least a part of the first screen in response to selection of the object.

According to various embodiments of the disclosure, the one or more computer programs further include computer-executable instructions that, when executed by the one or more processors, cause the electronic device to transmit the first data related to the second screen so that the first data is mirrored on a display of the external display device by using a virtual display, and during the mirroring, the second screen may not be displayed on the first screen.

According to various embodiments of the disclosure, the one or more computer programs further include computer-executable instructions that, when executed by the one or more processors, cause the electronic device to, in response to a request for changing the display orientation of the third screen, display the third screen in a changed display orientation on at least a part of the first screen, and in response to a touch input on the third screen, perform a function corresponding to a position where the touch input has occurred, based on reference coordinates for the changed display orientation.

According to various embodiments of the disclosure, the one or more computer programs further include computer-executable instructions that, when executed by the one or more processors, cause the electronic device to acquire the reference coordinates for the changed display orientation, transform, based on the reference coordinates, coordinates of the position where the touch input on the third screen has occurred into coordinates on the second screen, and perform a function corresponding to the transformed coordinates.

According to various embodiments of the disclosure, the second screen may include an execution screen of at least one application, and the third screen corresponds to at least a part of the second screen.

According to various embodiments of the disclosure, the one or more computer programs further include computer-executable instructions that, when executed by the one or more processors, cause the electronic device to, in response to selection of one of the at least one application, display a third screen corresponding to the selected application on at least a part of the first screen.

According to various embodiments of the disclosure, the one or more computer programs further include computer-executable instructions that, when executed by the one or more processors, cause the electronic device to generate an additional virtual display corresponding to the selected application, and may transmit third data related to the selected application so that the third data is mirrored on the display of the external display device by using the generated additional virtual display.

According to various embodiments of the disclosure, the one or more computer programs further include computer-executable instructions that, when executed by the one or more processors, cause the electronic device to adjust a display orientation and a size of the third screen corresponding to the selected application, change the reference coordinates based on the third screen for which the display orientation and size have been adjusted, and when a touch input is made based on the changed reference coordinates via the third screen corresponding to the selected application, perform a function corresponding to coordinates at which the touch input has occurred.

According to various embodiments of the disclosure, the one or more computer programs further include computer-executable instructions that, when executed by the one or more processors, cause the electronic device to display the third screen including objects indicating respective executable functions related to a display control for at least one of the second screen or the third screen.

According to various embodiments of the disclosure, the one or more computer programs further include computer-executable instructions that, when executed by the one or more processors, cause the electronic device to, when an object indicating a screen fit function is selected from among the objects, change an aspect ratio of the second screen to correspond to an aspect ratio of the external display device.

Figure 4:
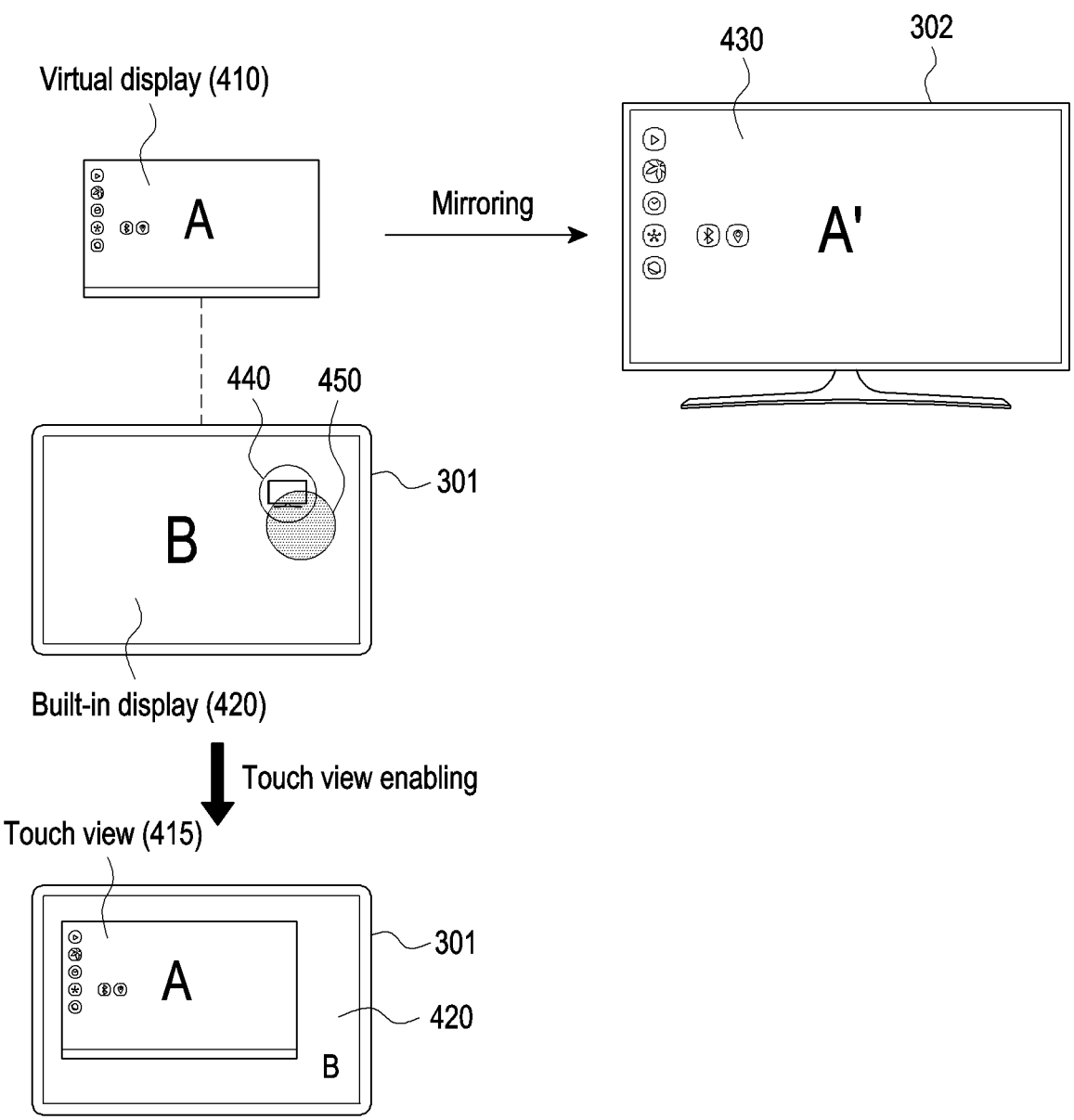
FIG. 4 is a diagram for illustrating a built-in display and a virtual display in an electronic device according to an embodiment of the disclosure.

FIG. 4 is a diagram for illustrating a built-in display and a virtual display in the electronic device according to an embodiment of the disclosure.

In order to assist in understanding descriptions of FIG. 4, reference will be made to FIGS. 5A and 5B.

Figure 5A:
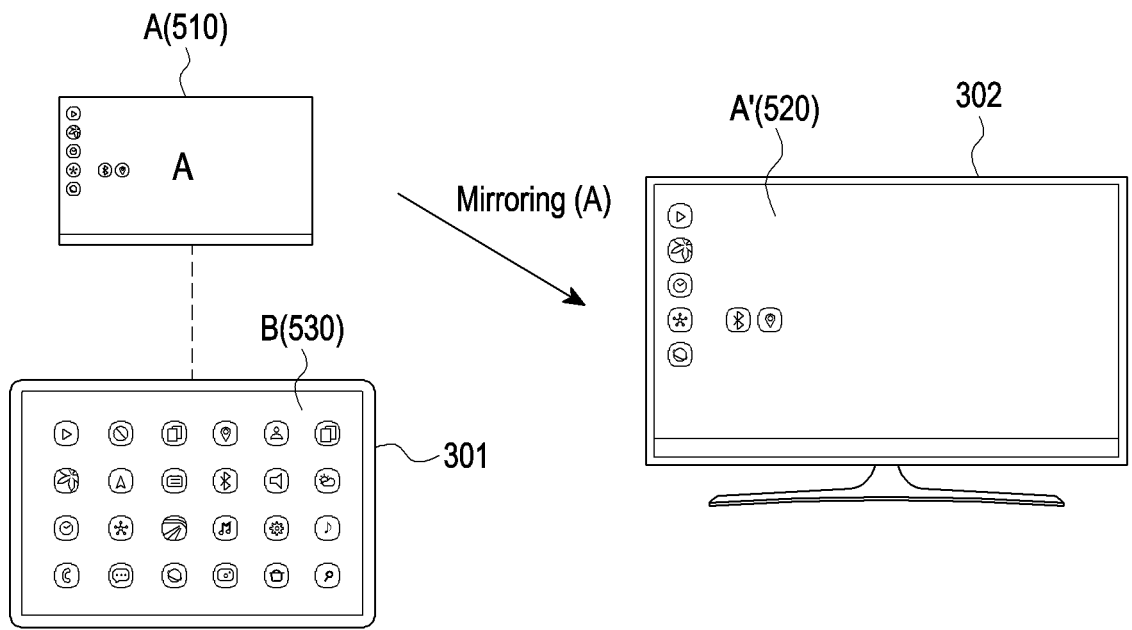
FIG. 5A illustrates a mode in which no virtual display screen is displayed on an electronic device according to an embodiment of the disclosure.
Figure 5B:
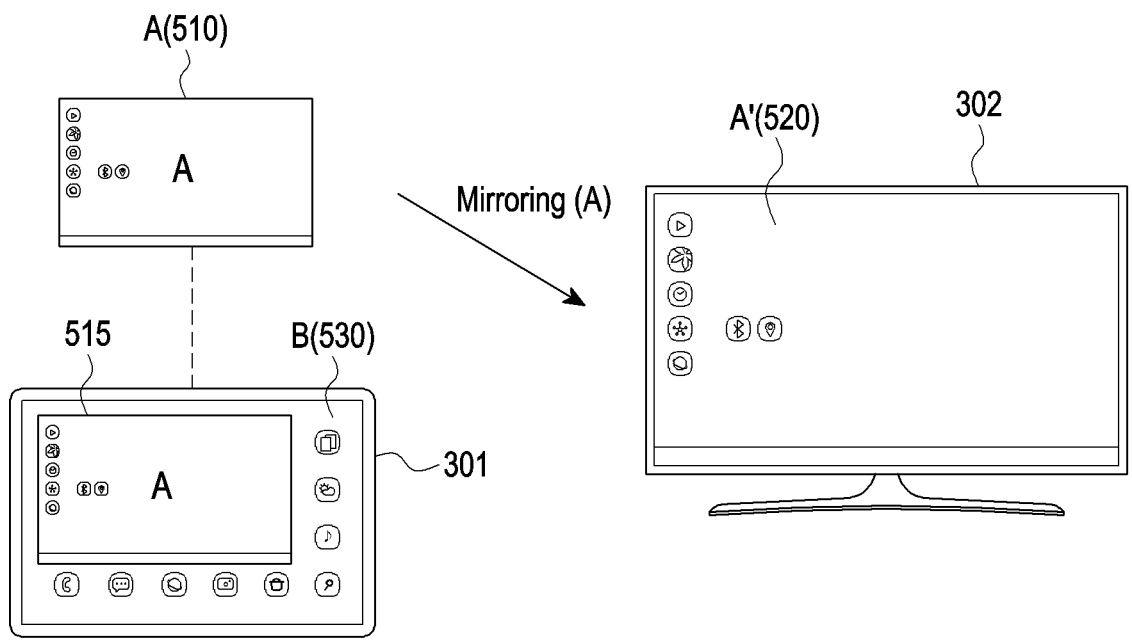
FIG. 5B illustrates a mode in which a virtual display screen is displayed on an electronic device according to an embodiment of the disclosure.

FIG. 5A illustrates a mode in which no virtual display screen is displayed on an electronic device according to an embodiment of the disclosure, and FIG. 5B illustrates a mode in which a virtual display screen is displayed on an electronic device according to an embodiment of the disclosure.

Referring to FIG. 4, a connection to an external display device 302 may be made for mirroring with the electronic device 301. The electronic device 301 may display an object 440 for displaying a screen control function of the external display device 302. The object 440 may be generated and displayed based on a communication connection for mirroring with the external display device 302.

According to an embodiment of the disclosure, the object 440 may float on a screen (e.g., screen B) 420 of the electronic device 301 and may be referred to as a floating icon. As illustrated in FIG. 4, the object 440 may be superimposed on the screen (e.g., screen B) 420, and move to various positions on the screen (e.g., screen B) 420 according to an input to the object 440. For example, the object 440 may move to a specific position within the screen (e.g., screen B) 420 in response to a user input for moving the same, such as a drag input or a slide input.

According to an embodiment of the disclosure, when the electronic device 301 is requested for at least one function, for example, mirroring during execution of an application, the external display device 302 may display screen-related data transmitted periodically or in real time. The electronic device 301 may generate multiple screen data when mirroring is requested. For example, a user may configure, for the application, whether to display a screen during the mirroring in a first display mode or a second display mode. If displaying in the first display mode is configured for at least one application, different screens may be displayed on the electronic device 301 and the external display device 302, and if displaying in the second mode is configured, the same screen may be displayed on the electronic device 301 and the external display device 302. In this case, the electronic device 301 may transmit the screen-related data to the external display device 302, based on a resolution determined during a mirroring connection.

Referring to FIG. 4, a screen (e.g., screen A) 410 of a virtual display may or may not be displayed on the display of the electronic device 301 depending on a user selection of the first display mode or the second display mode. For example, when the user selects 450 the object 440 for displaying the screen control function of the external display device 302, a control screen 415 (or window) (e.g., a touch view) superimposing on at least a part of the screen (e.g., screen B) 420 of the electronic device 310 may be displayed. According to an embodiment of the disclosure, the touch view of FIG. 4 may be overlappingly displayed on at least part of the built-in display screen (e.g., screen B) 420 or may be displayed in a size that occupies the entire built-in display screen (e.g., screen B) 420.

According to an embodiment of the disclosure, the control screen 415 is generated to correspond to the screen (e.g., screen A) of the virtual display, and may enable a user touch input. Accordingly, a screen (e.g., screen A') 430 of the external display device 302 may be controlled via the control screen 415 corresponding to the screen (e.g., screen A) of the virtual display of the electronic device 301.

According to various embodiments of the disclosure, the electronic device 301 may support the first display mode in which the screen (e.g., screen B) 420 of the source device (e.g., the electronic device 301) is mirrored as it is and displayed on the display of the sink device (e.g., the external display device 302), and the second display mode in which the screen (e.g., screen B) 420 of the source device (e.g., the electronic device 301) is not displayed on the display of the sink device (e.g., the external display device 302), and only the screen (e.g., screen A) 410 of the virtual display of the source device is displayed on the display of the sink device. Here, in the second display mode, the screen (e.g., screen A) 410 of the virtual display of the source device and the screen (e.g., screen A') 430 displayed on the display of the external display device 302 may be substantially the same screen, differing only in a size (or resolution). For example, content displayed on screen A and content displayed on screen A' may be the same.

For example, referring to FIG. 5A, in order to output a screen (e.g., screen A) 510 of a virtual display via the external display device 302, the electronic device 301 may transmit data associated with the screen (e.g., screen A) 510 of the virtual display to the external display device 302. Here, the screen (e.g., screen A) 510 of the virtual display may be a screen different from a screen (e.g., screen B) 530 displayed on the display of the electronic device 301.

The data associated with the screen (e.g., screen A) 510 of the virtual display may include information enabling a screen configuration of the external display device 302 to be displayed in the same configuration as that of the electronic device 301. Therefore, if the screen (e.g., screen A) 510 of the virtual display includes content A, content A may be displayed via the screen (e.g., screen A') 520 of the external display device 302 in the same configuration as that of the screen (e.g., screen A) 510 of the virtual display. For example, content A via the virtual display of the electronic device 301 may be mirrored to the external display device 302.

Here, when a function for controlling the screen (e.g., screen A') 520 of the external display device 302 is disabled, for example, when there is no user selection 450 for the object 440 of FIG. 4, the built-in display screen (e.g., screen B) 530 may be displayed on the display of the electronic device 301, without displaying of the screen (e.g., screen A) 510 of the virtual display.

Referring to FIG. 5B, when the function for controlling the screen (e.g., screen A') 520 of the external display device 302 is enabled, for example, when the user selection 450 for the object 440 of FIG. 4 is received, a control screen (e.g., a touch view) 515 may be overlappingly displayed on at least a part of the built-in display screen (e.g., screen B) 530. Here, the control screen 515 may correspond to the screen (e.g., screen A) 510 of the virtual display. According to various embodiments of the disclosure, the control screen 515 is obtained by displaying (or projecting) the screen (e.g., screen A) 510 of the virtual display as it is, and may be an area, in which a touch input is possible, provided in the form of a window within the built-in display screen (e.g., screen B) 530. Therefore, depending on a touch input within the control screen 515, a function corresponding to a position where the touch input has occurred within the screen (e.g., screen A') 520 of the external display device 302 may be performed. As illustrated in FIG. 5B, the user may control the screen (e.g., a sink screen) of the external display device 302 via the electronic device 301 while maintaining a multi-tasking state without switching between the virtual display and the built-in display.

Figure 6A:
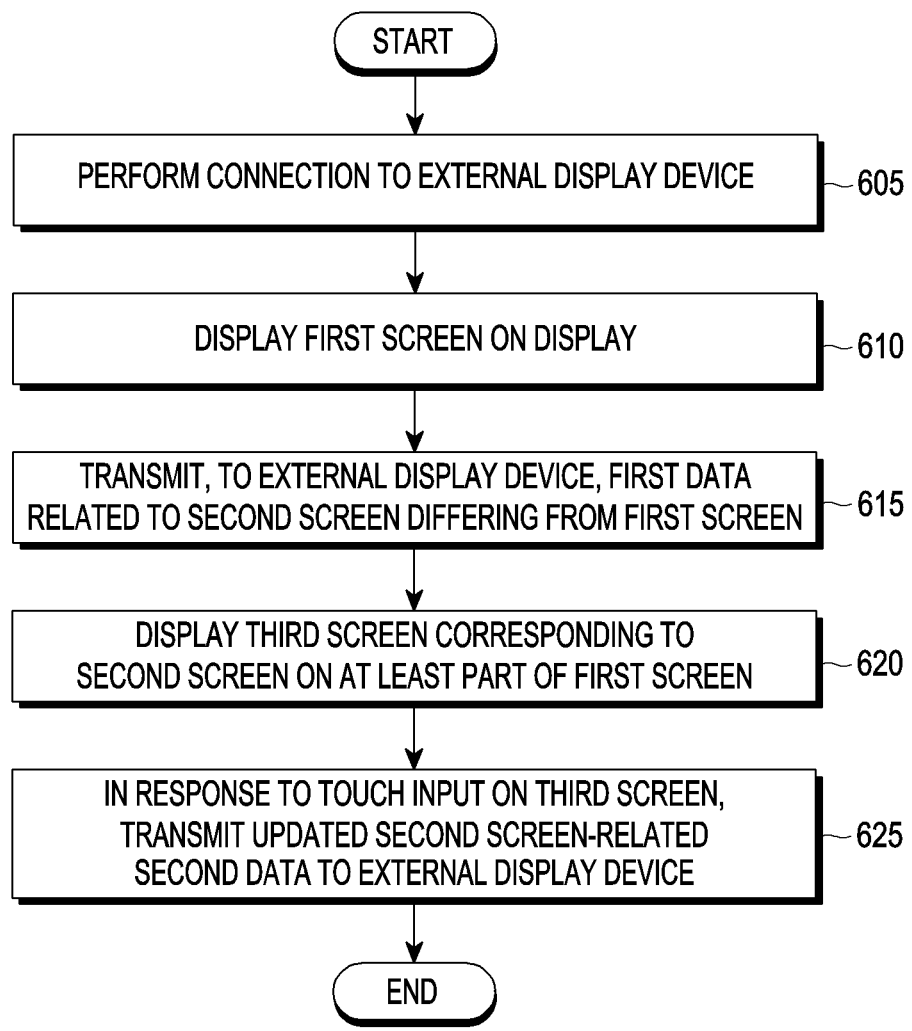
FIG. 6A is an operation flowchart for controlling a screen of an external display device by an electronic device according to an embodiment of the disclosure.

FIG. 6A is an operation flowchart for controlling a screen of an external display device by an electronic device according to an embodiment of the disclosure.

Referring to FIG. 6A, an operation method may include operations 605 to 625. Respective operations of the operation method in FIG. 6A may be performed by an electronic device (e.g., the electronic device 101 of FIG. 1, the electronic device 201 of FIG. 2, or the electronic device 301 of FIG. 3) and at least one processor (e.g., at least one of the processor 120 of FIG. 1 or the processor 320 of FIG. 3) of the electronic device.

In operation 605, the electronic device 301 may make a connection to the external display device 302. According to an embodiment of the disclosure, the electronic device 301 may be connected to the external display device 302 by using Miracast communication.

In operation 610, the electronic device 301 may display a first screen (e.g., a built-in display) on the display 360, and in operation 615, the electronic device 301 may transmit first data related to a second screen (e.g., a virtual display) different from the first screen to the external display device 202. According to an embodiment of the disclosure, the electronic device 301 may transmit the first data related to the second screen to the external display device 302 so that the first data related to the second screen is mirrored on the display of the external display device 302 by using the virtual display. According to an embodiment of the disclosure, the second screen may not be displayed on the first screen during the mirroring.

In operation 620, the electronic device 301 may display a third screen (e.g., a control screen (or a touch view)) corresponding to the second screen on at least a part of the first screen. According to an embodiment of the disclosure, the first screen may include an object for displaying the third screen, and in response to selection of the object on the first screen, the electronic device 301 may display the third screen corresponding to the second screen on at least a part of the first screen. For example, when the object 440 of FIG. 4 is selected, the touch view corresponding to the screen (e.g., screen A) 410 of the virtual display may be displayed on the built-in display screen (e.g., screen B) 420.

According to an embodiment of the disclosure, the third screen may include objects indicating respective executable functions related to display control for at least one of the second screen or the third screen. For example, a user may control, in the electronic device 301, a mirrored screen of the external display device 302 by selecting one of the objects. The electronic device 301 may start controlling the screen of the external display device 302 by using a touch input via the third screen (e.g., a touch view).

In operation 625, in response to the touch input on the third screen, the electronic device 301 may transmit updated second screen-related second data to the external display device 202 via the communication module 390.

According to an embodiment of the disclosure, in response to a request for changing the display orientation of the third screen, the electronic device 301 may display the third screen in the changed display orientation on at least a part of the first screen. According to an embodiment of the disclosure, in response to the touch input on the third screen, a function corresponding to a position where the touch input has occurred may be performed based on reference coordinates for the changed display orientation. For example, the electronic device 301 may perform synchronization so that the display orientation of the third screen matches the orientation of the virtual display. Because coordinates on the third screen (e.g., the touch view) change due to the change of the display orientation, the electronic device 301 may need to change the reference coordinates for the changed display orientation to acquire accurate coordinates for a touch input point, based on the changed reference coordinates.

According to an embodiment of the disclosure, the performing of the function corresponding to the position where the touch input has occurred may include acquiring the reference coordinates for the changed display orientation, transforming, based on the reference coordinates, coordinates of the position where the touch input on the third screen has occurred into coordinates on the second screen, and performing the function corresponding to the transformed coordinates. Accordingly, the electronic device 301 may identify a position in the virtual display, which corresponds to a touch input position on the touch view.

According to an embodiment of the disclosure, the second screen may include an execution screen of at least one application, and the third screen corresponds to at least a part of the second screen.

According to an embodiment of the disclosure, in response to selection of one of the at least one application, the electronic device 301 may display a third screen corresponding to the selected application on at least a part of the first screen. The third screen corresponding to the selected application may be a touch view generated by displaying an additional virtual display.

According to an embodiment of the disclosure, the electronic device 301 may generate an additional virtual display corresponding to the selected application, and may transmit third data related to the selected application so that the third data is mirrored on the display of the external display device by using the generated additional virtual display.

Figure 6B:
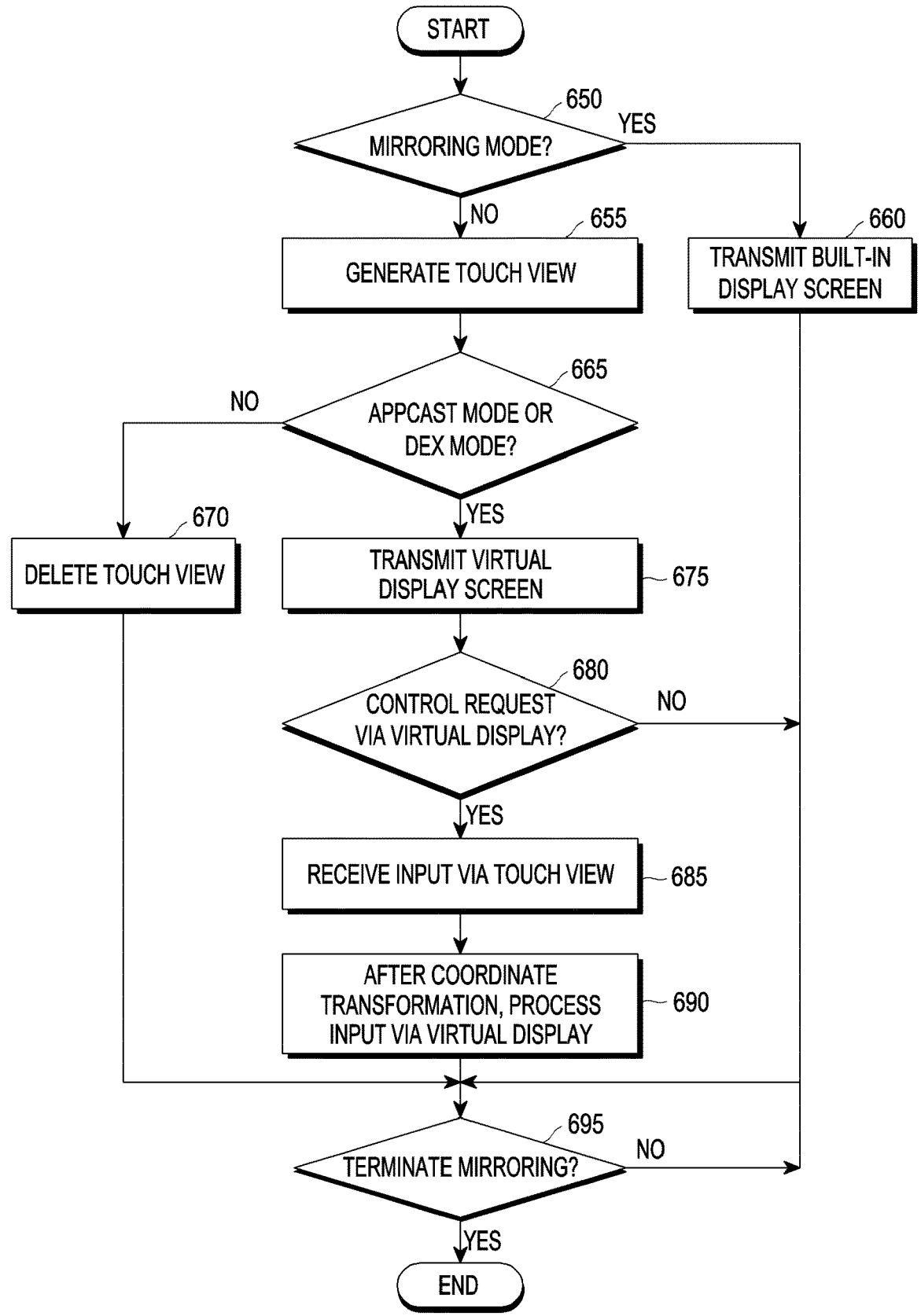
FIG. 6B is an operation flowchart according to a scheme of making a communication connection to an external display device by an electronic device according to an embodiment of the disclosure.

FIG. 6B is an operation flowchart according to a scheme of making a communication connection to an external display device by an electronic device according to an embodiment of the disclosure.

According to various embodiments of the disclosure, respective operations of the operation method in FIG. 6B may be performed by an electronic device (e.g., the electronic device 101 of FIG. 1, the electronic device 201 of FIG. 2, or the electronic device 301 of FIG. 3) and at least one processor (e.g., at least one of the processor 120 of FIG. 1 or the processor 320 of FIG. 3) of the electronic device.

Referring to FIG. 6B, according to an embodiment of the disclosure, mirroring may start in response to a user request, and the electronic device 301 may identify a mirroring mode in operation 650. For example, a general mirroring mode may be a mode in which content being output on the display of the electronic device 301 is output on the display of the external display device 302 in real time. Therefore, for the mirroring mode, the electronic device 301 may transmit a built-in display screen to the electronic device 301 in operation 660.

According to an embodiment of the disclosure, for a mode other than the general mirroring mode, the electronic device 301 may generate, in operation 655, a touch view for controlling a screen of the external display device 302. Here, the touch view may be a control screen which enables a touch input corresponding to a virtual display. According to an embodiment of the disclosure, in operation 665, the electronic device 301 may identify whether the mode is an AppCast mode or a dex mode. If the mode is neither the AppCast mode nor the dex mode, it may be considered that the screen control for the external display device 302 is not necessary, and the touch view may be deleted in operation 670.

According to an embodiment of the disclosure, for the AppCast mode or the dex mode, the electronic device 301 may transmit a virtual display screen of the electronic device 301 to the display of the external display device 302. Here, the transmitting of the virtual display screen to the external display device 302 should be understood as transmitting content of the virtual display screen or data associated with the virtual display to the external display device 302.

According to an embodiment of the disclosure, when a control request in operation 680 via the virtual display is received in operation 680, for example, when the user is to control a screen output via the external display device 302, such as the virtual display screen, by selecting the object 440 of FIG. 4, the generated touch view may be displayed on the display of the electronic device 301. According to an embodiment of the disclosure, when there is no control request in operation 680 via the virtual display, and the object 440 of FIG. 4 is not selected, operation 695 may be performed.

In order to control the screen output via the external display device 302, the electronic device 301 may receive an input via the touch view in operation 685, and may transform coordinates and then process the input via the virtual display in operation 690. In this case, since coordinates of the touch view and coordinates of the virtual display are different from each other, the electronic device 301 may identify a position, at which the touch has occurred, on the virtual display by transforming the coordinates of the touch view into coordinates of the virtual display according to scale values. Therefore, the electronic device 301 may process the touch input so that a function corresponding to the position where the touch has occurred is performed.

According to an embodiment of the disclosure, in operation 695, whether the mirroring is terminated is identified, and the aforementioned operations may be repeatedly performed as long as the mirroring is not terminated. In FIG. 6B, descriptions have been provided by taking an example of a case where a touch view is generated when entering the mirroring mode. However, a touch view may be generated in response to a control request received from a user as in operation 680, and an operation sequence may not be limited thereto.

Figure 7:
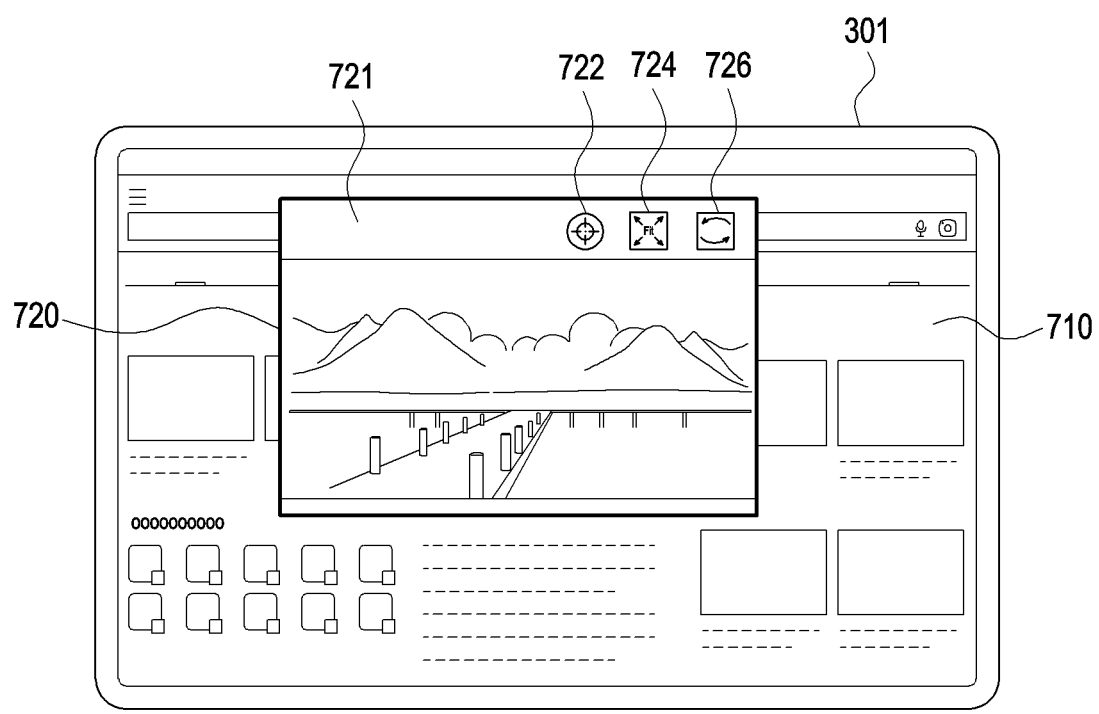
FIG. 7 illustrates elements of a virtual display screen according to an embodiment of the disclosure.

FIG. 7 illustrates a diagram illustrating elements of a virtual display screen according to an embodiment of the disclosure.

According to various embodiments of the disclosure, the electronic device 301 may control (or operate) a screen of the external display device 302 independently of the external display device 302. To this end, in relation to controlling of the external display device 302, the electronic device 301 may display objects indicating respective executable functions on the display of the electronic device 301.

Referring to FIG. 7, the electronic device 301 may display objects 722, 724, and 726 disposed in an area adjacent to a second screen (e.g., a touch view) 720 or in at least a part of the second screen, wherein the second screen is displayed overlappingly on a first screen (e.g., a built-in display screen) 710. For example, FIG. 7 illustrates a case where the display objects 722, 724, and 726 indicating respective executable functions are disposed in the upper area (or shortcut bar) 721 of the second screen. Here, the second screen (e.g., a touch view) 720 displays a virtual display screen as it is, and may be the same as the screen displayed on the display of the external display device 302.

According to various embodiments of the disclosure, in relation to controlling of the external display device 302, the executable functions may include at least one of a function for switching to a full mode/focus mode, a screen fit function, and/or a rotation function. In addition to the description above, the executable functions may further include, but are not limited to, a function of displaying a list including multiple running applications (or tasks) to facilitate selection of a focus app.

According to an embodiment of the disclosure, the rotation function may be a function of changing and synchronizing the orientation of the touch view 720 according the display orientation of the virtual display. For example, when an execution screen of at least one application is output via the virtual display, a specific application may not support the portrait orientation, so that execution screen data of the application may be provided based on the landscape orientation. In this case, since the display orientation of the virtual display is based on the orientation supported by the application, the display orientation of the virtual display or the orientation of the touch view 720 may be automatically changed in response to the running application. On the other hand, since the display orientation of the virtual display is changed in response to a user's selection for the object 726 indicating the rotation function, the orientation of the touch view 720 corresponding to the virtual display may also be changed.

According to an embodiment of the disclosure, the rotation function for changing the display orientation of the touch view 720 is a valid function for the virtual display, and may not be affected by rotation of the electronic device 301. For example, even if the electronic device 301 itself rotates, the display orientation of the virtual display or touch view 720 is not changed, and the display orientation of the virtual display or the display orientation of the touch view 720 may be changed only when the user's selection for the rotation function is received. Therefore, the display orientation of the built-in display screen 710 of the electronic device 301 may be changed according to rotation of the electronic device 301, but the display orientation of the virtual display screen or that of the touch view 720 corresponding to the virtual display screen may be maintained.

According to an embodiment of the disclosure, the screen fit function may be a function for adjusting an aspect ratio of the screen displayed on the display of the external display device 302. For example, when the aspect ratio of the electronic device 301 is different from that of the external display device 302, the screen is displayed based on the external display device 302, so that letter boxes may appear in the upper and lower areas of the display of the external display device 302. Therefore, when the user selects a fit function that is the screen fit function, the electronic device 301 may change, when generating the virtual display, an aspect ratio of the virtual display to correspond to a display aspect ratio of the external display device 302. Accordingly, no letter box may appear in the external display device 302. According to an embodiment of the disclosure, when an unfit function is selected, the electronic device 301 may change the aspect ratio of the virtual display to correspond to the aspect display ratio of the electronic device 301.

According to an embodiment of the disclosure, the function for switching to the full mode/focus mode may include a focus mode function for outputting an execution screen of one application to the external display device 302 when execution screens of two or more applications are displayed via the virtual display, and a full mode function for outputting execution screens of all running applications to the external display device 302. For example, when a touch view of the same form as the virtual display is displayed on the display (e.g., the built-in display) of the electronic device 301, if there are multiple running applications, sizes of individual touch views corresponding to the respective applications may be very small. Therefore, according to various embodiments of the disclosure, by selecting the focus mode function, the user may designate an application to be controlled from among two or more running applications via the virtual display. Accordingly, the electronic device 301 may provide a touch view corresponding to an execution screen of the designated application. According to an embodiment of the disclosure, when the user selects the full mode function, the electronic device 301 may, while displaying execution screens of two or more applications via the virtual display on the display (e.g., the built-in display) of the electronic device 301, transmit related data to the external display device 302.

In the descriptions above, in relation to the control of the external display device 302, an example of executable functions has been described by taking an example of the function for switching to the full mode/focus mode, the screen fit function, or the rotation function, but functions that can be provided by the electronic device 301 in relation to the control may not be limited thereto.

Figure 8:
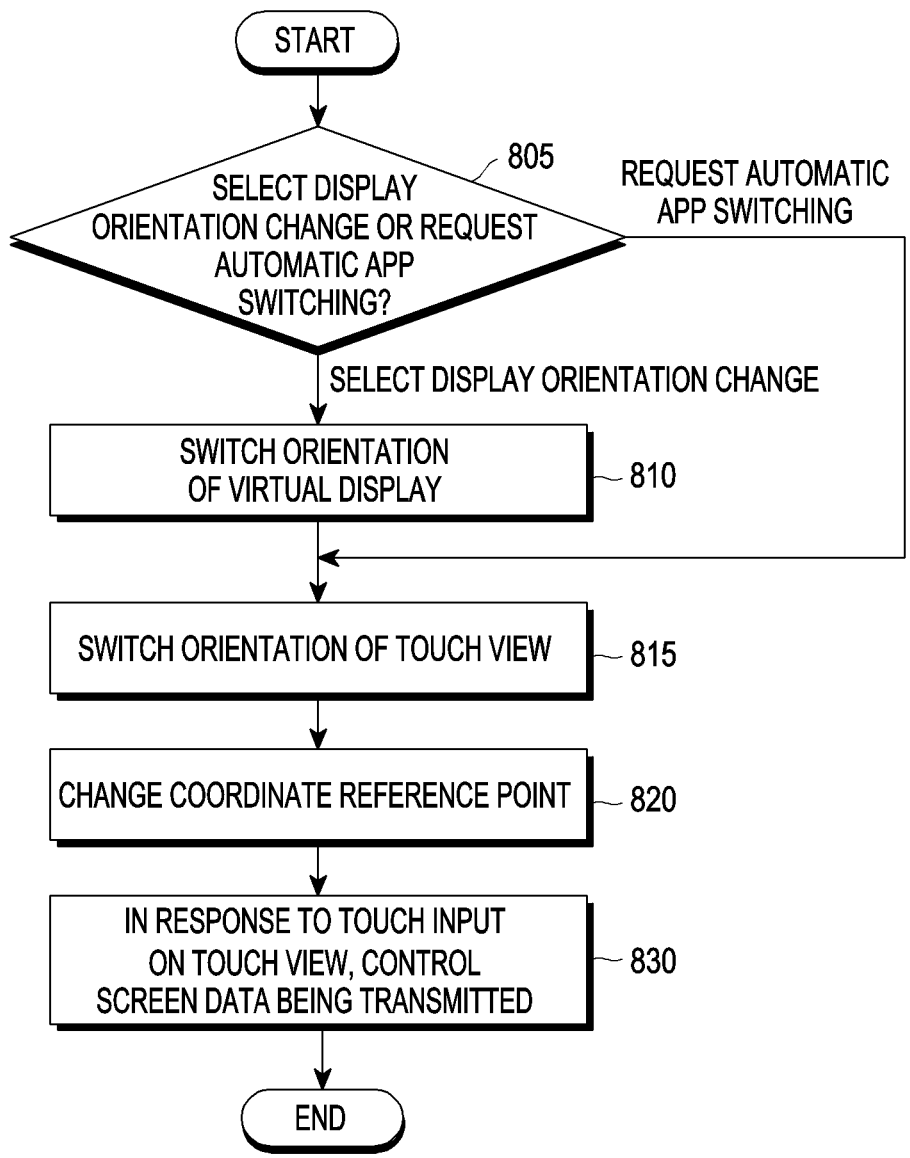
FIG. 8 is an operation flowchart of an electronic device according to a display orientation function according to an embodiment of the disclosure.

FIG. 8 is an operation flowchart of an electronic device according to a display orientation function according to an embodiment of the disclosure.

In order to assist in understanding descriptions of FIG. 8, reference will be made to FIGS. 9A and 9B.

Figure 9A:
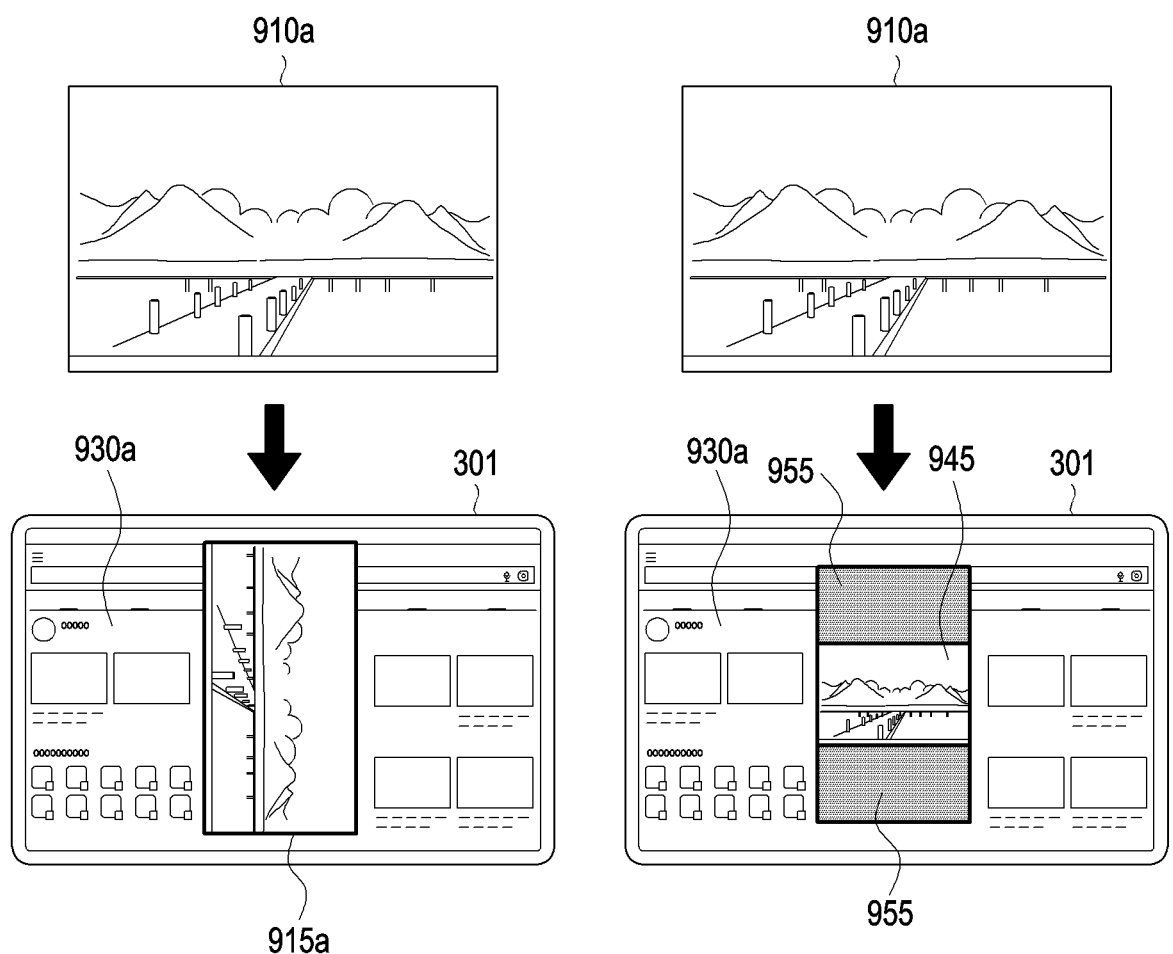
FIG. 9A illustrates a screen during synchronization of display orientations according to an embodiment of the disclosure.
Figure 9B:
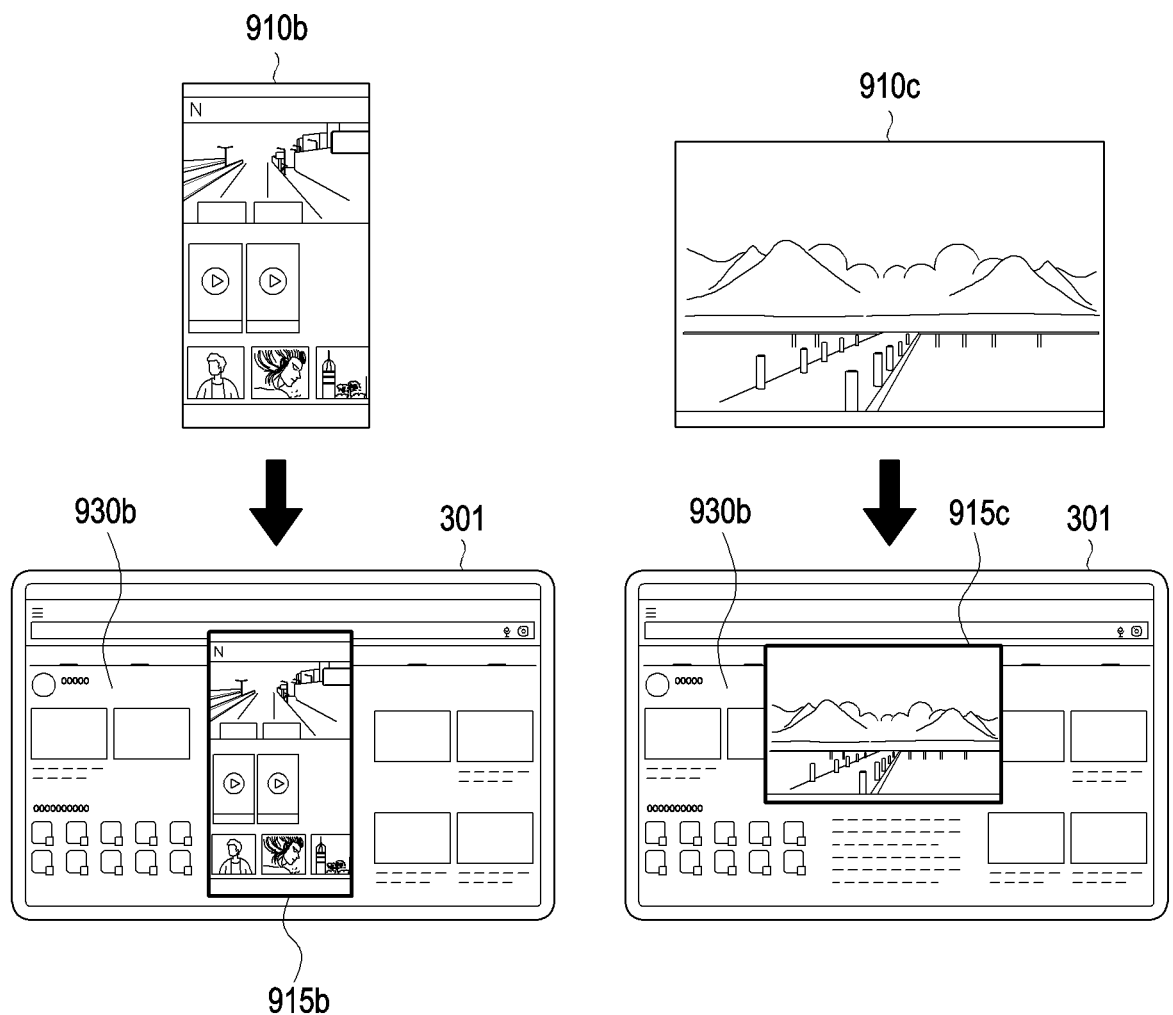
FIG. 9B illustrates a screen during asynchronization of display orientations according to an embodiment of the disclosure.

FIG. 9A illustrates a screen during synchronization of display orientations according to an embodiment of the disclosure, and FIG. 9B illustrates a screen during asynchronization of display orientations according to an embodiment of the disclosure.

According to various embodiments of the disclosure, respective operations of the operation method in FIG. 8 may be performed by an electronic device (e.g., the electronic device 101 of FIG. 1, the electronic device 201 of FIG. 2, or the electronic device 301 of FIG. 3) and at least one processor (e.g., at least one of the processor 120 of FIG. 1 or the processor 320 of FIG. 3) of the electronic device.

Referring to FIG. 8, in operation 805, the electronic device 301 may identify whether a display orientation change is selected or automatic app switching is requested. For example, the electronic device 301 may identify whether automatic app switching is requested because an executed application does not support display of a specific orientation or a user selection for the rotation function for changing a display orientation is received. Referring to FIG. 9A, if synchronization of the display orientation is not applied, the electronic device 301 may display a touch view 915a in an orientation different from the orientation of a virtual display on a built-in display 930a of the electronic device 301. In this way, even if the display orientation of the virtual display 910a is the portrait orientation, when a synchronization function to match the orientation of the touch view with the display orientation of the virtual display 910a is not applied, the electronic device 301 may display the touch view 915a in an orientation different from the display orientation of the virtual display 910a. In addition, when synchronization of the display orientation is not applied, a letter box 955 may appear even if a touch view 945 in the same orientation as the display orientation of the virtual display 910a is displayed.

According to various embodiments of the disclosure, the electronic device 301 may provide the rotation function which enables changing of the display orientation of the virtual display. When a user selects an object indicating the rotation function, which is displayed on the touch view, the electronic device 301 may match the display orientation of the touch view with the display orientation of the virtual display.

In response to a display orientation change (e.g., selection of the rotation function) being selected, the electronic device 301 may switch (change) the orientation of the virtual display in operation 810, and may switch the orientation of the touch view in operation 815 in response to switching of the orientation of the virtual display. According to an embodiment of the disclosure, in response to the request of automatic app switching, the electronic device 301 may consider that execution in a rotated orientation rather than the current orientation is requested during execution of the application, and may change the orientation of the touch view in operation 815.

For example, referring to FIG. 9B, when synchronization of the display orientation is applied, if the orientation of a virtual display 910b is a portrait orientation (e.g., a portrait state), the electronic device 310 may display a touch view 915b in the portrait orientation on a built-in display 930b of the electronic device 301. In addition, when the orientation of a virtual display 910c is the landscape orientation, the electronic device 301 may display a touch view 915c in the landscape orientation on the built-in display 930b of the electronic device 301. When an app requiring automatic change of a display orientation is executed, for example, when an app is executed in the landscape orientation (e.g., a landscape state), such as a video app, the electronic device 301 may control the orientation of the touch view 915c to change to the landscape orientation.

In response to switching of the touch view orientation, the electronic device 301 may change a coordinate reference point in operation 820. For example, the electronic device 301 may acquire reference coordinates for the changed display orientation of the touch view, and may identify, based on the reference coordinates, coordinates of a touch input position on the touch view.

According to an embodiment of the disclosure, in operation 830, screen data being transmitted to the external display device 302 may be controlled in response to a touch input on the touch view. For example, the electronic device 301 may transform the coordinates of the position where the touch input has occurred into coordinates on the virtual display, and may control a function corresponding to the transformed coordinates to be performed.

According to an embodiment of the disclosure, while synchronization being performed so that the display orientation of the virtual display and the display orientation of the touch view match, a screen displayed on the display of the external display device 302 may also be updated and displayed. Here, the display orientation of the screen displayed on the display of the external display device 302 may match the display orientation of the virtual display.

According to various embodiments of the disclosure, the electronic device 301 may provide a virtual display with transformed coordinates by changing a coordinate reference point for a touch view with a changed orientation, and may control a function corresponding to a position, at which an input event has occurred, in a screen of the virtual display to be performed. In addition, according to various embodiments of the disclosure, by changing the coordinate reference point, scale values may be kept the same to prevent letter boxes from appearing, and the electronic device 301 may process a touch input via the touch view as if controlling a screen of the external display device 302.

To this end, the electronic device 301 may transmit, to the external display device 302, data related to the screen (or updated screen) that changes according to execution of the function corresponding to the position where the touch input has occurred, thereby controlling screen data being transmitted to the external display device 302. In this way, the updated screen may be output in real time via the display of the external display device 302 according to the touch input from the electronic device 301.

Figure 10:
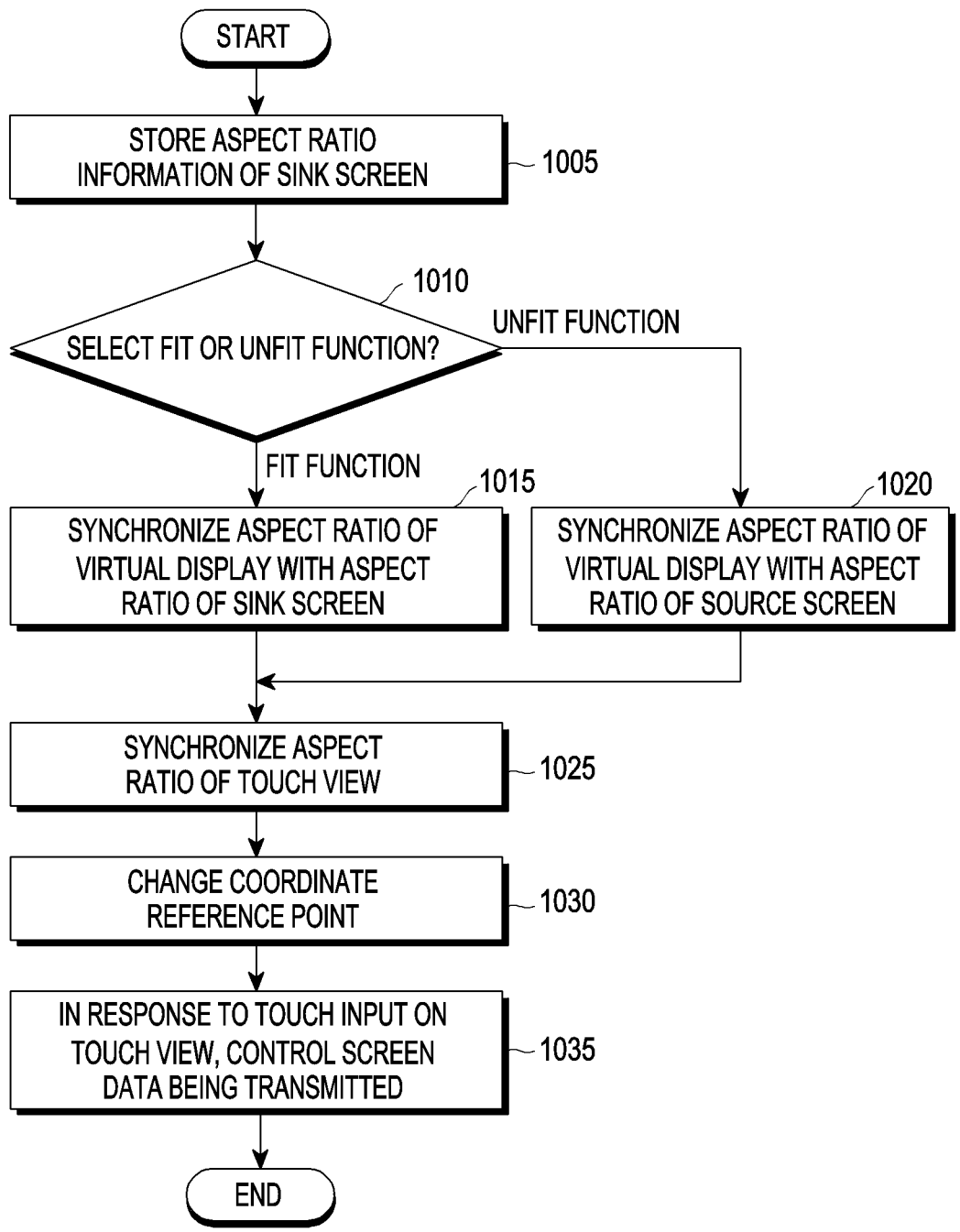
FIG. 10 is an operation flowchart of an electronic device according to an aspect ratio function according to an embodiment of the disclosure.

FIG. 10 is an operation flowchart of an electronic device according to an aspect ratio function according to an embodiment of the disclosure. In order to assist in understanding descriptions of FIG. 10, reference will be made to FIGS. 11A and 11B.

Figure 11A:
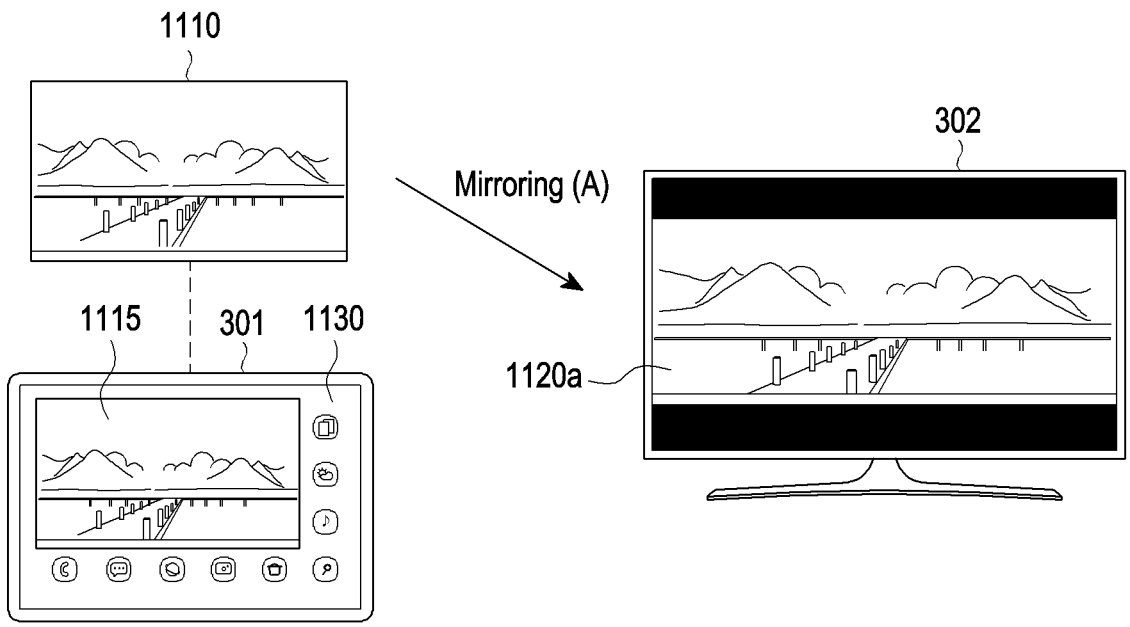
FIG. 11A illustrates a screen when an aspect ratio is adjusted according to an embodiment of the disclosure.
Figure 11B:
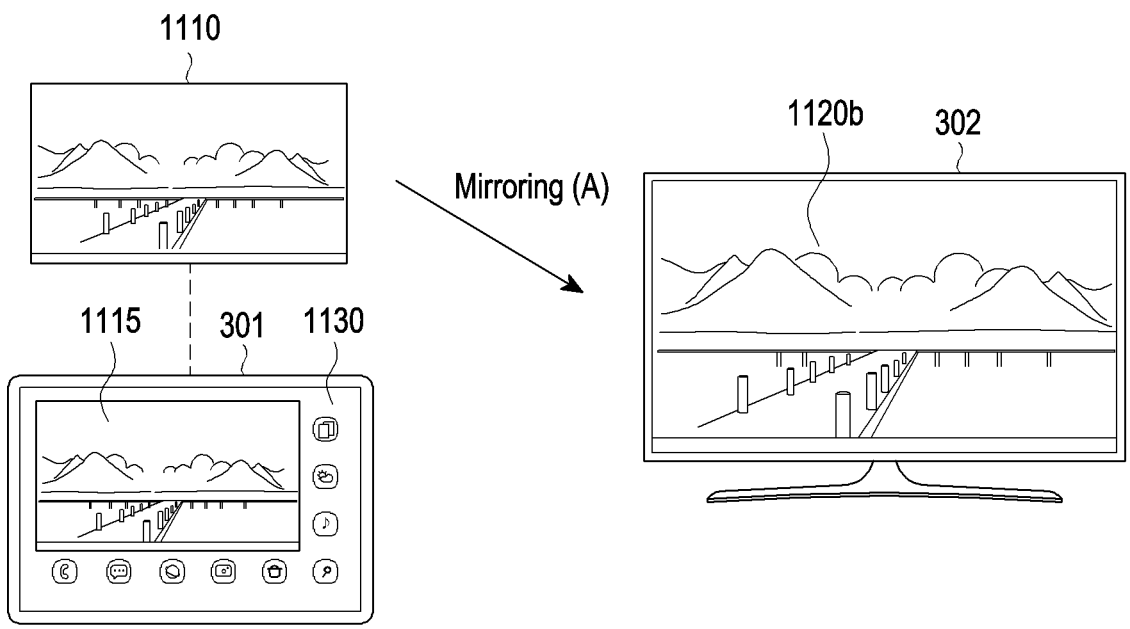
FIG. 11B illustrates a screen when an aspect ratio is not adjusted according to an embodiment of the disclosure.

FIG. 11A illustrates a screen when an aspect ratio is adjusted according to an embodiment of the disclosure, and FIG. 11B illustrates a screen when an aspect ratio is not adjusted according to an embodiment of the disclosure.

Referring to FIGS. 11A and 11B, according to various embodiments of the disclosure, respective operations of the operation method in FIG. 10 may be performed by an electronic device (e.g., the electronic device 101 of FIG. 1, the electronic device 201 of FIG. 2, or the electronic device 301 of FIG. 3) and at least one processor (e.g., at least one of the processor 120 of FIG. 1 or the processor 320 of FIG. 3) of the electronic device.

According to various embodiments of the disclosure, the electronic device 301 may provide the screen fit function which enables changing of an aspect ratio of a virtual display. When a user selects an object indicating the screen fit function displayed on a touch view, the electronic device 301 may adjust an aspect ratio of a screen to be displayed on the external display device 302, for example, an aspect ratio of the virtual display.

Referring to FIG. 10, in operation 1005, the electronic device 301 may store aspect ratio information of a sink screen. According to an embodiment of the disclosure, the electronic device 301 may acquire (or receive) information associated with the external display device 302 via transmission and reception of a real-time streaming protocol (RTSP) message during a mirroring connection. For example, the information associated with the external display device 302 may include at least one of identification information of the external display device 302, resolution information supportable by the external display device 302, or display aspect ratio information of the external display device 302.

In operation 1010, the electronic device 301 may identify whether the fit function or the unfit function for aspect ratio adjustment is selected. For example, the electronic device 301 may generate a virtual display with an aspect ratio of the electronic device 301 or a display aspect ratio of the external display device 302. A user may change an aspect ratio of the virtual display by selecting an object corresponding to the fit function or the unfit function, and the electronic device 301 may also change an aspect ratio of a touch view to correspond to the changed aspect ratio of the virtual display.

According to an embodiment of the disclosure, descriptions have been provided by taking an example of a case where the aspect ratio of the virtual display is changed by selecting the object indicating the fit function or the unfit function, but the aspect ratio of the virtual display may be changed also via an object indicating enabling/disabling of a function (e.g., the fit function). For example, for a toggle scheme for selecting enabling or disabling of the fit function, when an object indicating the fit function is selected once, the fit function may be disabled, and when the object is selected again, the fit function may be enabled. In addition, the unfit function may be enabled by disabling the fit function, and whether to enable the fit function or the unfit function may be determined according to a preconfigured user configuration, without displaying the object related to the fit function or the unfit function.

According to an embodiment of the disclosure, when the electronic device 301 does not provide a function for selecting the fit function or the unfit function, and one of the functions is configured as default, for example, when only the fit function is provided, operation 1010 and operation 1020 of FIG. 10 may be omitted. According to another embodiment of the disclosure, when the electronic device 301 provides only the unfit function, operation 1010 and operation 1015 of FIG. 10 may be omitted, and operation 1025 to operation 1035 may also be omitted. As described above, a scheme of selecting the fit function or the unfit function may not be limited to this, and at least some operations of FIG. 10 may be omitted depending on selection of the fit function or the unfit function. According to an embodiment of the disclosure, in response to selection of the fit function, the electronic device 301 may synchronize the aspect ratio of the virtual display with the aspect ratio of the sink screen in operation 1015. According to an embodiment of the disclosure, in response to selection of the fit function, the electronic device 301 may change, when generating the virtual display, the aspect ratio of the virtual display to correspond to the display aspect ratio (e.g., the aspect ratio of the sink screen) of the external display device 302.

According to an embodiment of the disclosure, in response to selection of the unfit function, the electronic device 301 may synchronize the aspect ratio of the virtual display with the aspect ratio of the source screen in operation 1020. According to an embodiment of the disclosure, when the unfit function is selected, the electronic device 301 may change the aspect ratio of the virtual display to correspond to the display aspect ratio (e.g., the aspect ratio of the source screen) of the electronic device 301. In operation 1025, the electronic device 301 may synchronize the aspect ratio of the touch view.

For example, referring to FIG. 11A, when the unfit function is selected, the electronic device 301 may display a touch view 1115 corresponding to a virtual display 1110 on a built-in display 1130, and may output, via the external display device 302, a screen with an aspect ratio of the virtual display 1110 synchronized to a source aspect ratio. Accordingly, when the screen 1120*a* corresponding to the virtual display 1110 is displayed, the display is based on the source aspect ratio, and therefore letter boxes may appear on the external display device 302.

According to an embodiment of the disclosure, referring to FIG. 11B, when the fit function is selected, the electronic device 301 may display the touch view 1115 corresponding to the virtual display 1110 on the built-in display 1130, and since a screen 1120*b* with the aspect ratio of the virtual display 1110 synchronized to the aspect ratio of the sink screen is output via the external display device 302, no letter box may appear.

The electronic device 301 may change a coordinate reference point in operation 1030, and may control, in operation 1035, screen data being transmitted, in response to a touch input on the touch view. Here, operation 1030 and operation 1035 are the same as operation 820 and operation 830 of FIG. 8, and therefore detailed descriptions thereof will be omitted.

According to various embodiments of the disclosure, when two or more apps (or two or more tasks) are executed, the electronic device 301 may provide the full mode/focus mode function in which all execution screens of respective running apps may be output via the virtual display or only one app execution screen may be output via the virtual display.

For example, when the user selects an object indicating the full mode/focus mode function, which is displayed on the touch view, all executed apps (or app execution screens or task screens) may be displayed or only a focused app may be output via the virtual display. According to an embodiment of the disclosure, when the user wants to change a focused app, the user may perform switching to the full mode and then select a desired app, thereby changing the focused app. According to an embodiment of the disclosure, when switching to the focus mode, the changed focused app may be output via the virtual display.

According to various embodiments of the disclosure, methods for displaying a focused app may be broadly divided into two types. A first method may include cropping a focused app part from the full screen of the virtual display, and a second method may include generating a separate virtual display and then outputting a focused app via the separate virtual display.

First, reference will be made to FIG. 12 to provide a detailed description for the method of cropping a focused app part from the full screen of the virtual display according to an embodiment.

Figure 12:
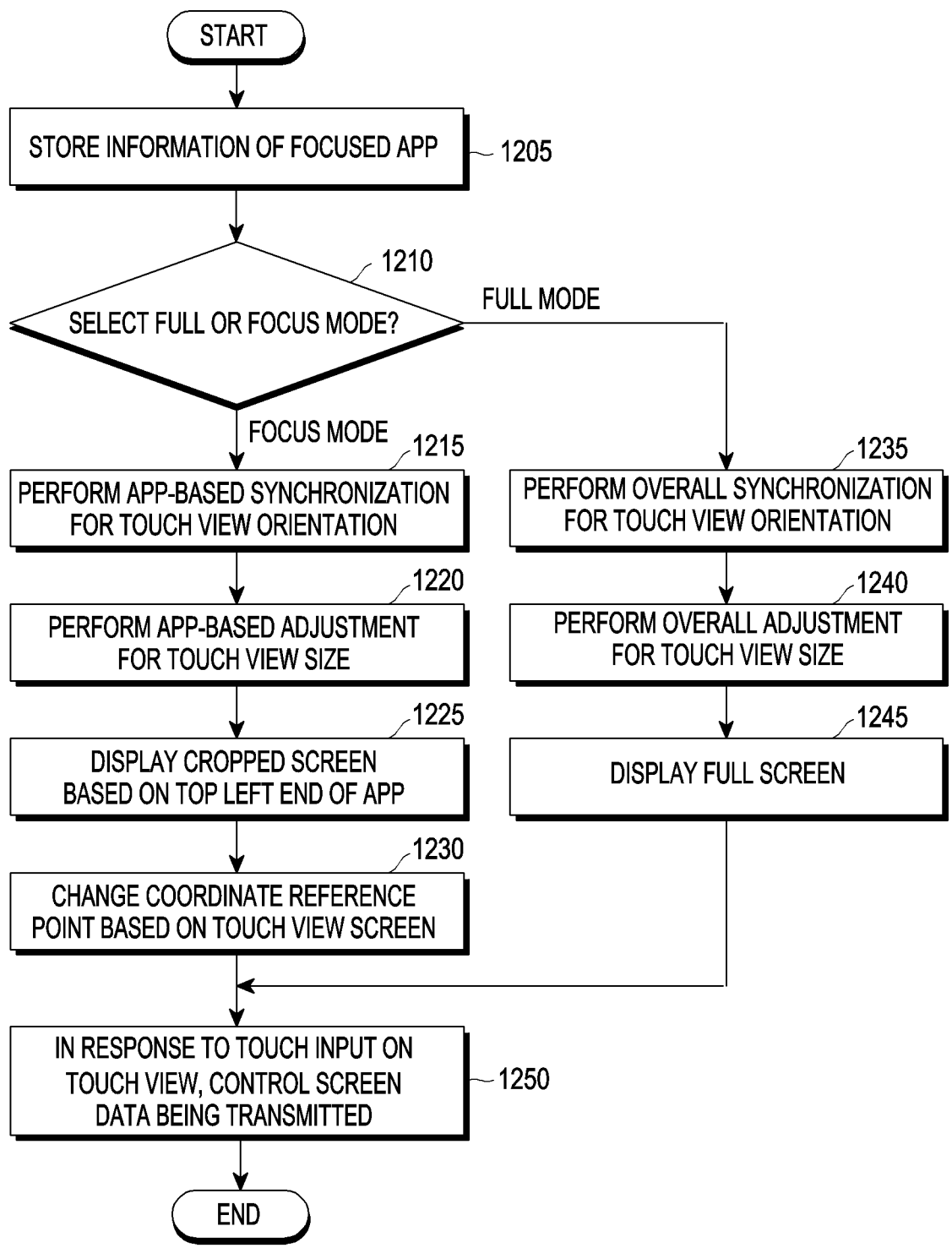
FIG. 12 is an operation flowchart of an electronic device according to a focus function according to an embodiment of the disclosure.

FIG. 12 is an operation flowchart of an electronic device according to a focus function according to an embodiment of the disclosure. In order to assist in understanding descriptions of FIG. 12, reference will be made to FIGS. 13, 14A, and 14B.

Figure 13:
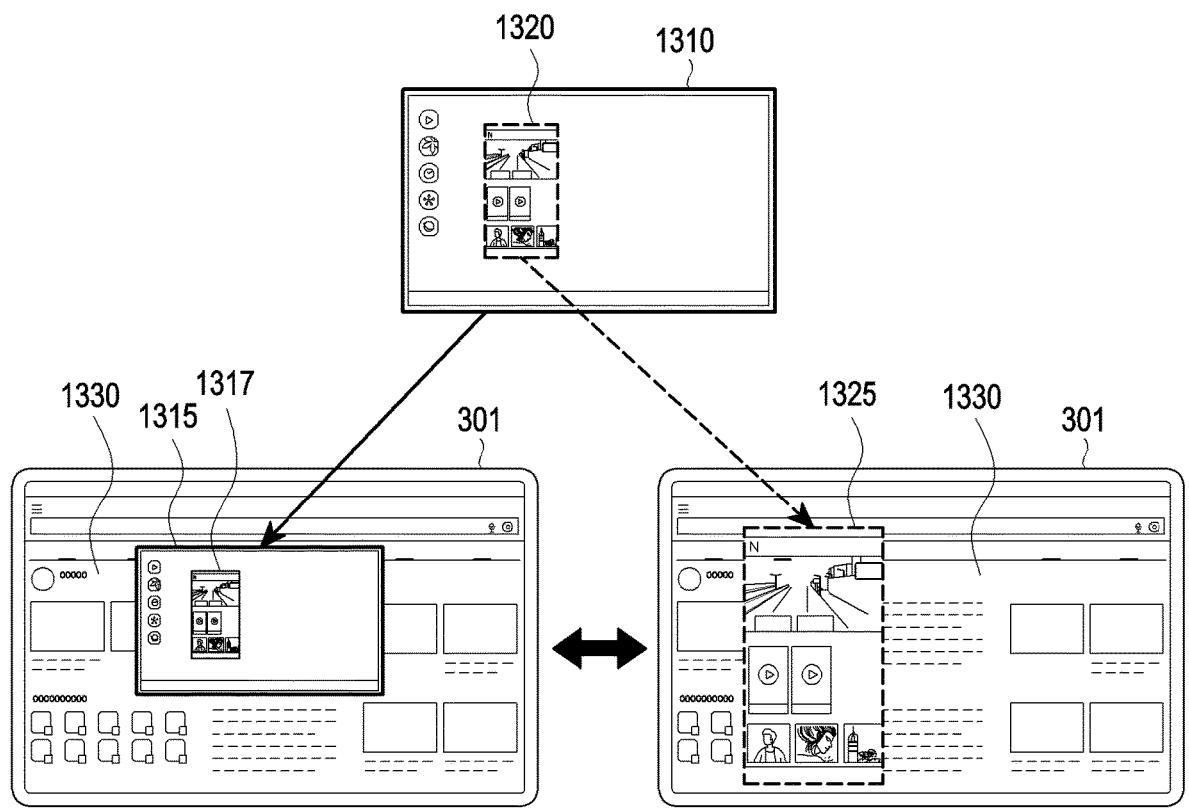
FIG. 13 illustrates a screen for comparison and illustration of enabling or disabling of a focus function according to an embodiment of the disclosure.
Figure 14A:
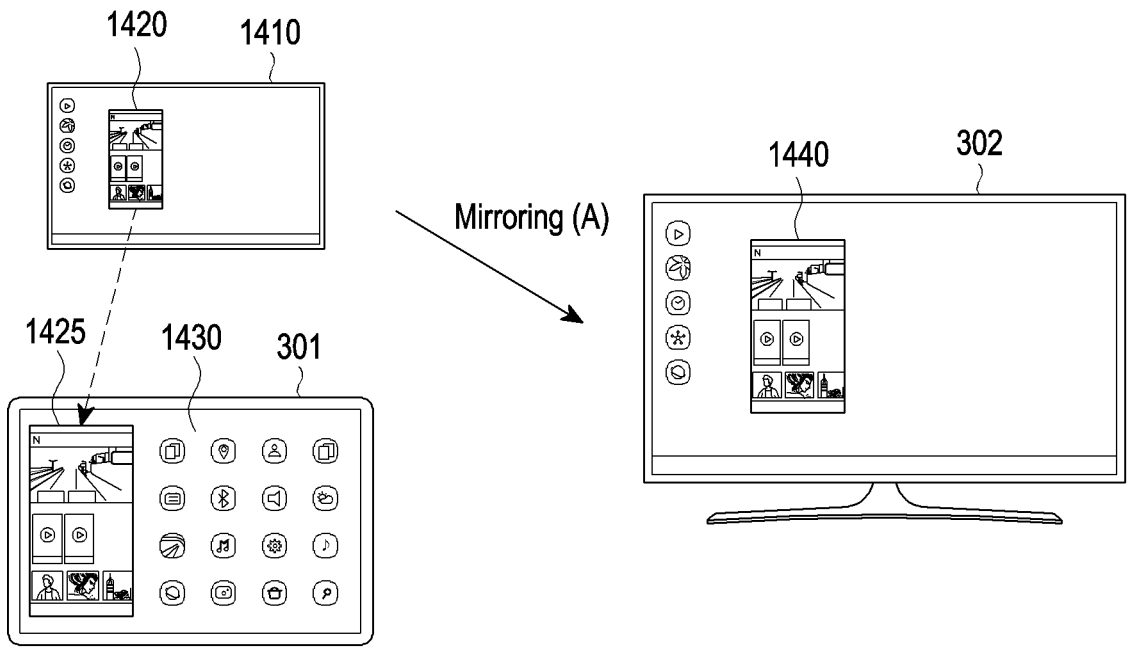
FIG. 14A illustrates a screen when a focus function is enabled according to an embodiment of the disclosure.
Figure 14B:
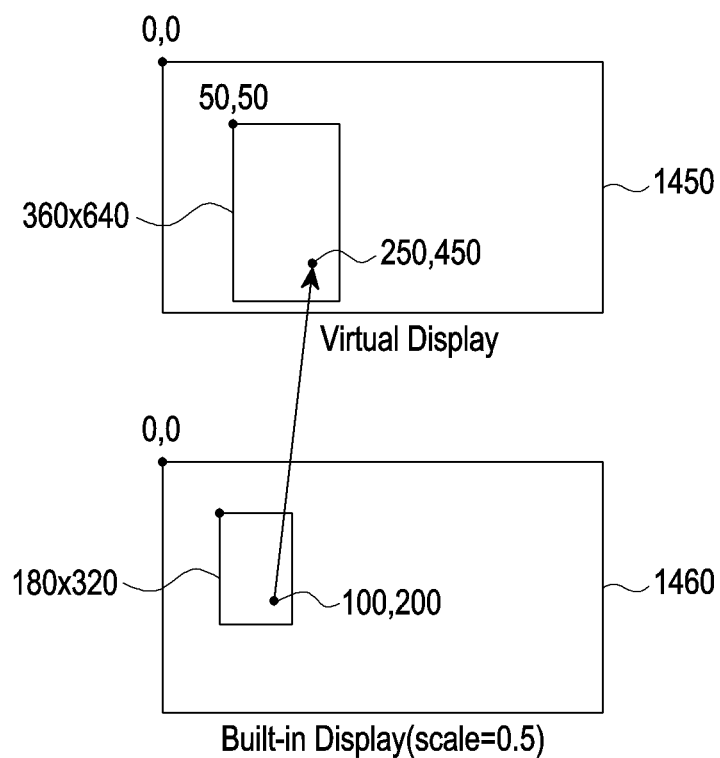
FIG. 14B illustrates coordinate transformation when a focus function is enabled according to an embodiment of the disclosure.

FIG. 13 illustrates a screen for comparison and illustration of enabling or disabling of a focus function according to an embodiment of the disclosure, FIG. 14A illustrates a screen when a focus function is enabled according to an embodiment of the disclosure, and FIG. 14B illustrates coordinate transformation when a focus function is enabled according to an embodiment of the disclosure.

According to various embodiments of the disclosure, respective operations of the operation method in FIG. 12 may be performed by an electronic device (e.g., the electronic device 101 of FIG. 1, the electronic device 201 of FIG. 2, or the electronic device 301 of FIG. 3) and at least one processor (e.g., at least one of the processor 120 of FIG. 1 or the processor 320 of FIG. 3) of the electronic device.

Referring to FIG. 12, in operation 1205, the electronic device 301 may store information on a focused app. For example, the electronic device 301 may store information on an app currently in use or an app positioned on a top layer among two or more executed apps.

In operation 1210, the electronic device 301 may identify whether the full mode is selected or the focus mode is selected. According to an embodiment of the disclosure, in FIG. 12, descriptions are provided by taking an example of a case where the full mode or the focus mode is selected. However, in addition to a scheme of directly selecting one mode by a user, the electronic device 301 may basically provide only one of the full mode or the focus mode. The scheme of selecting the full mode or the focus mode may not be limited to this, and at least some operations of FIG. 12 may be omitted depending on selection of the full mode or the focus mode.

In response to selection of the focus mode, the electronic device 301 may perform app-based synchronization for a touch view orientation in operation 1215, and may perform app-based adjustment for a touch view size in operation 1220. For example, the electronic device 301 may synchronize the orientation of the touch view, based on the orientation of the focused app (e.g., the focused app orientation of FIG. 13), and may adjust the size of the touch view, based on a size of the focused app (e.g., the focused app size of FIG. 13). The electronic device 301 may change the size of the touch view according to configured scale values, wherein the scale values are configured based on the app size, and since the focused app is smaller in size than the full screen (e.g., the virtual display), up-scaling or non-scaling may be performed depending on a resolution of the electronic device 301. According to an embodiment of the disclosure, the electronic device 310 may display a cropped screen, based on the top left end of the app in operation 1225, and may change a coordinate reference, based on a touch view screen in operation 1230. For example, the electronic device 301 may configure the top left end of the focused app to be a reference point, perform cropping according to the size of the app, and then output a cropped screen via the external display device 302.

According to an embodiment of the disclosure, in response to selection of the full mode, the electronic device 301 may perform overall synchronization for a touch view orientation in operation 1235, and may perform overall adjustment for a touch view size in operation 1240. For example, the electronic device 301 may synchronize the touch view orientation according to an overall reference orientation (e.g., the orientation of the virtual display screen 1310 of FIG. 13), and may also adjust the touch view size according to an overall reference size (e.g., the size of the virtual display screen 1310 of FIG. 13). Here, selection of the full mode may indicate disabling of the focus function.

Referring to FIG. 13, when the electronic device 301 generates the virtual display while two or more apps displayed on the virtual display screens 1310 and 1320 are running, the topmost app may correspond to the focused app. In response to selection of the full mode, the electronic device 301 may display the full screen in operation 1245 after orientation synchronization and size adjustment for the touch view. Here, the full screen corresponds to the virtual display screen 1310, and may be a touch view which is displayed on a built-in display and enables a touch input. For example, in the full mode, the electronic device 301 may synchronize the touch view according to the overall orientation of the virtual display, for example, based on the orientation of the virtual display, and may also change the size of the touch view, based on the overall size of the virtual display. Accordingly, as illustrated in FIG. 13, the electronic device 301 may display a full screen 1315 corresponding to the virtual display on a built-in display 1330, and the full screen 1315 may include the app 1317. In this case, the full screen 1315 is an area enabling a user touch input, and therefore a user touch input for the app 1317 may be possible. Therefore, the user may select the focused app by touching the app 1317.

According to an embodiment of the disclosure, the user may select the focused app by selecting an object indicating the focus mode, which is displayed on the touch view, in addition to by the method of selecting the focused app by selecting the app 1317. In response to selection of the focus mode, the electronic device 301 may perform orientation synchronization and reference size adjustment based on the app 1317 of the touch view. For example, the electronic device 301 may generate a touch view 1325 corresponding to the focused app of the virtual display, and display the same on the built-in display 1330.

In operation 1250, the electronic device 301 may control screen data being transmitted, in response to a touch input on the touch view. For example, the electronic device 301 may transmit screen data corresponding to the focused app or virtual display to the external display device 302, provide the app (or the virtual display) with coordinate values at which the touch input has occurred, and control the app itself to perform a function corresponding to a corresponding position. Accordingly, the electronic device 301 may output, via the external display device 302, screen data which is changed (or updated) according to performing of the function.

Referring to FIG. 14A, the electronic device 301 may display a focused app 1420 of a virtual display 1410 on a built-in display 1430, and the virtual display 1410 including the focused app 1420 may be output via the display of the external display device 302. In this case, a screen of the external display device 302 may correspond to the virtual display 1410 including the focused app 1420. As illustrated in FIG. 14A, a touch view 1425 may correspond to an app 1440 screen displayed on the full screen of the external display device 302. Therefore, a user may control the app screen of the external display device 302 via a touch input to the touch view 1425.

For example, a position of the touch input may be identified via coordinate transformation as shown in FIG. 14B. Referring to FIG. 14B, when it is assumed that a resolution (or size) of a focused app on a virtual display 1450 is a first resolution (e.g., 360×640), and reference point coordinates in the top left end are (50, 50), a resolution (or size) of a touch view displayed on a built-in display 1460 may be configured to be the first resolution (e.g., 360×640) when non-scaling. When it is assumed that coordinates at which a touch input has occurred on the touch view are (100, 100), the coordinates of the touch input may be transformed to (150, 150) based on the reference point coordinates. Accordingly, the electronic device 301 may consider that the touch input has occurred at a position corresponding to the coordinates (150, 150) of the virtual display, and perform a function corresponding to the position. According to an embodiment of the disclosure, when a scale value is 0.5, the resolution (or size) of the touch view may be configured to be a second resolution (e.g., 180×320). In this case, coordinate transformation may be performed via equations, such as scaleX=100*1/scale+50 and scaleY=100*1/scale+50.

Accordingly, since the coordinates of the touch input are multiplied by a 1/scale value, the coordinates (100, 100) of the touch input may be transformed to (scaleX=250, scaleY=450). Therefore, the electronic device 301 may consider that the touch input has occurred at a position corresponding to the coordinates (250, 450) of the virtual display, and perform a function corresponding to the transformed coordinates.

Hereinafter, reference will be made to FIG. 15 to describe an embodiment of generating a separate virtual display and then outputting a focused app via the generated separate virtual display according to another embodiment.

Figure 15:
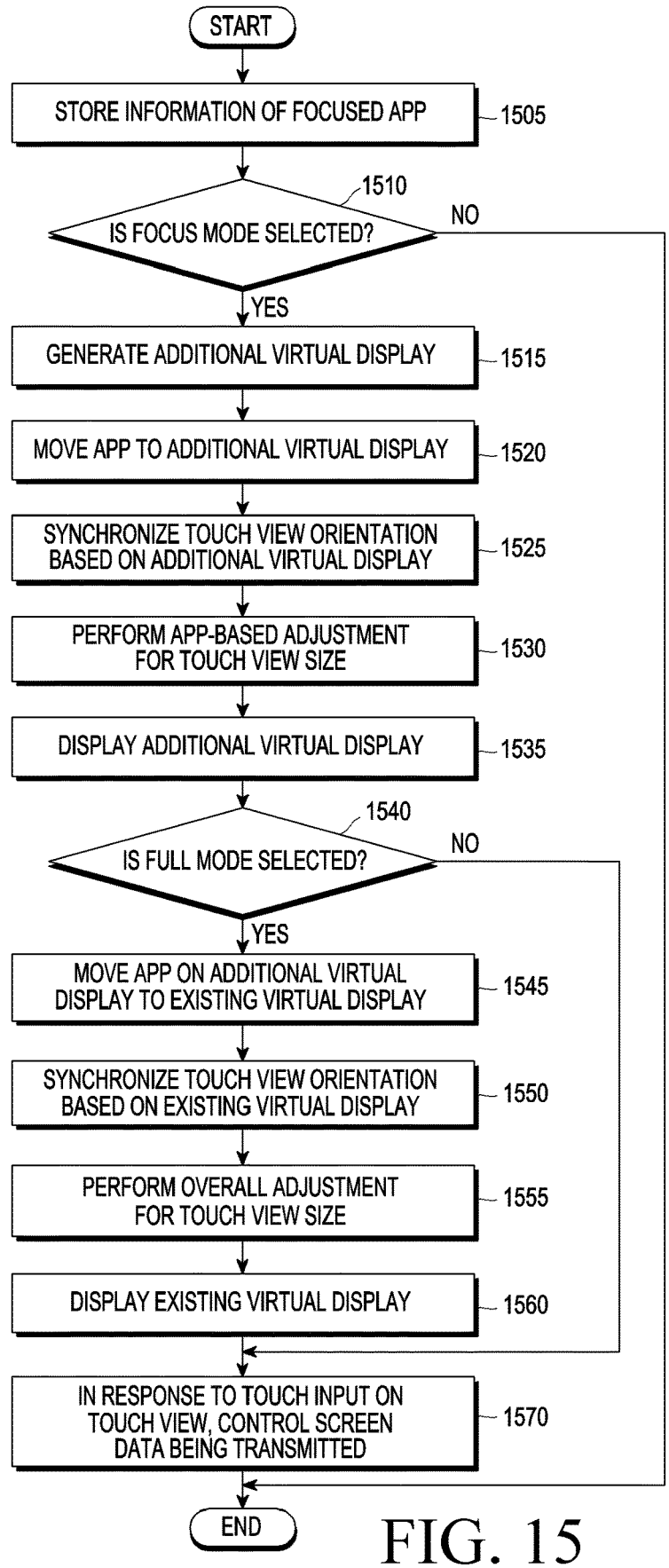
FIG. 15 is an operation flowchart of an electronic device according to a focus function according to an embodiment of the disclosure.

FIG. 15 is an operation flowchart of an electronic device according to a focus function according to an embodiment of the disclosure. In order to assist in understanding descriptions of FIG. 15, reference will be made to FIG. 16.

Figure 16:
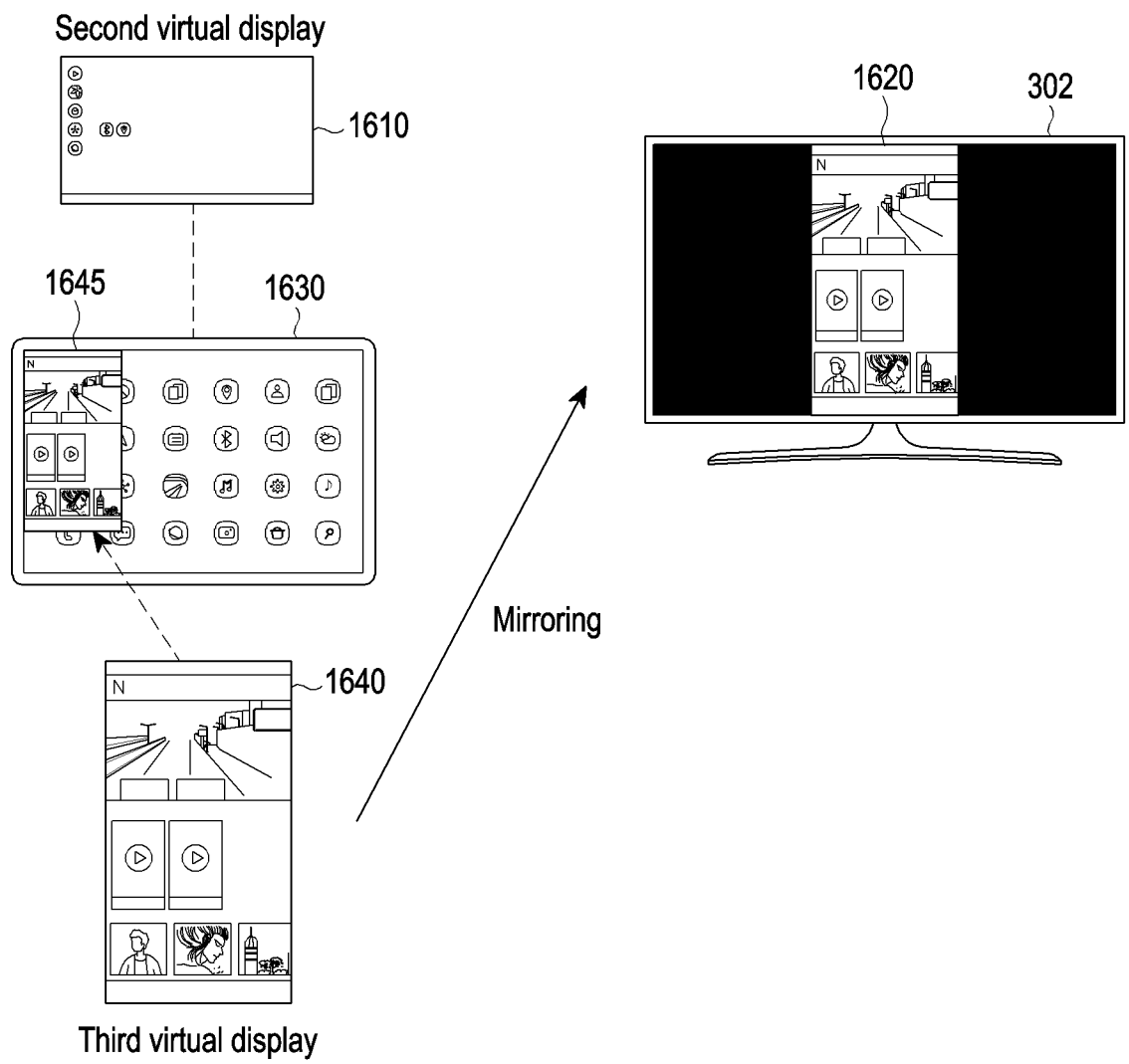
FIG. 16 illustrates a screen when a focus function is enabled according to an embodiment of the disclosure.

FIG. 16 illustrates a screen when a focus function is enabled according to an embodiment of the disclosure.

Referring to FIG. 15, in operation 1505, the electronic device 301 may store information of a focused app. In operation 1510, the electronic device 301 may identify whether the focus mode is selected. Operation 1505 and operation 1510 may be the same as operation 1205 and operation 1210 of FIG. 12, and therefore detailed descriptions thereof will be omitted. However, in FIG. 15, when the focus mode is selected, an additional virtual display is generated, and when the full mode is selected, operation is performed using the generated additional virtual display, so that, unlike in FIG. 12, a case of selecting the focus mode and a case of selecting the full mode will be described separately.

According to various embodiments of the disclosure, respective operations of the operation method in FIG. 15 may be performed by an electronic device (e.g., the electronic device 101 of FIG. 1, the electronic device 201 of FIG. 2, or the electronic device 301 of FIG. 3) and at least one processor (e.g., at least one of the processor 120 of FIG. 1 or the processor 320 of FIG. 3) of the electronic device.

In response to selection of the focus mode, the electronic device 301 may generate an additional virtual display in operation 1515, and move the app to the additional virtual display in operation 1520. Referring to FIG. 16, screen data being output on a second virtual display 1610 (or an existing virtual display) of the electronic device 301 may be mirrored and output on the display of the external display device 302. If the focus mode is selected, the screen data of the focused app may be mirrored and output on the display of the external display device 302 by using a newly generated third virtual display 1640 (or an additional virtual display) different from the second virtual display 1610. The electronic device 301 may change the screen data, which is to be transferred via mirroring, to correspond to the third virtual display 1640 rather than the second virtual display 1610 corresponding to the full screen. Accordingly, the external display device 302 may output screen data (e.g., screen data of the focused app) 1620 that is being output on a third virtual display 1640. The electronic device 301 may display a touch view 1645 corresponding to the screen data of the focused app on a built-in display 1630, while transmitting the screen data of the focused app to the external display device 302. In this way, when a separate virtual display itself, rather than cropped screen data, is displayed on the touch view 1645, image quality degradation may not occur in the touch view 1645, compared to the scheme of displaying cropped screen data on the touch view.

In operation 1525, the electronic device 301 may synchronize a touch view orientation based on the additional virtual display, and then may adjust a touch view size based on the app in operation 1530. In operation 1535, the electronic device 301 may display the additional virtual display. For example, the electronic device 301 may display the touch view corresponding to the additional virtual display on the built-in display. For example, the electronic device 301 may match the orientation of the touch view based on the orientation of the additional virtual display, and then may also adjust the size of the touch view based on the app.

According to an embodiment of the disclosure, the electronic device 301 may identify, in operation 1540, whether the full mode is selected, and may move the app from the additional virtual display to the existing virtual display in operation 1545 in response to selection of the full mode. According to an embodiment of the disclosure, in operation 1550, the electronic device 301 may synchronize the touch view orientation based on the existing virtual display, and then perform overall size adjustment for the touch view in operation 1555. In operation 1560, the electronic device 301 may display the existing virtual display. For example, the electronic device 301 may display the touch view corresponding to the existing virtual display on the built-in display. In this way, the orientation and size of the touch view may be adjusted by synchronizing orientation information or adjusting the size, the orientation information and size being changed depending on selection of the focus mode or the full mode. In response to the selection of the full mode, the external display device 302 may output the screen data on the second virtual display 1610 which is being output from the second virtual display 1610, instead of the screen data (e.g., screen data of the focused app) 1620 which is being output from the third virtual display 1640.

In operation 1570, the electronic device 301 may control the screen data being transmitted, in response to a touch input on the touch view. For example, the touch view in focus mode may display the additional virtual display corresponding to the focused app. According to an embodiment of the disclosure, the touch view in the full mode may display the existing virtual display.

Figure 17:
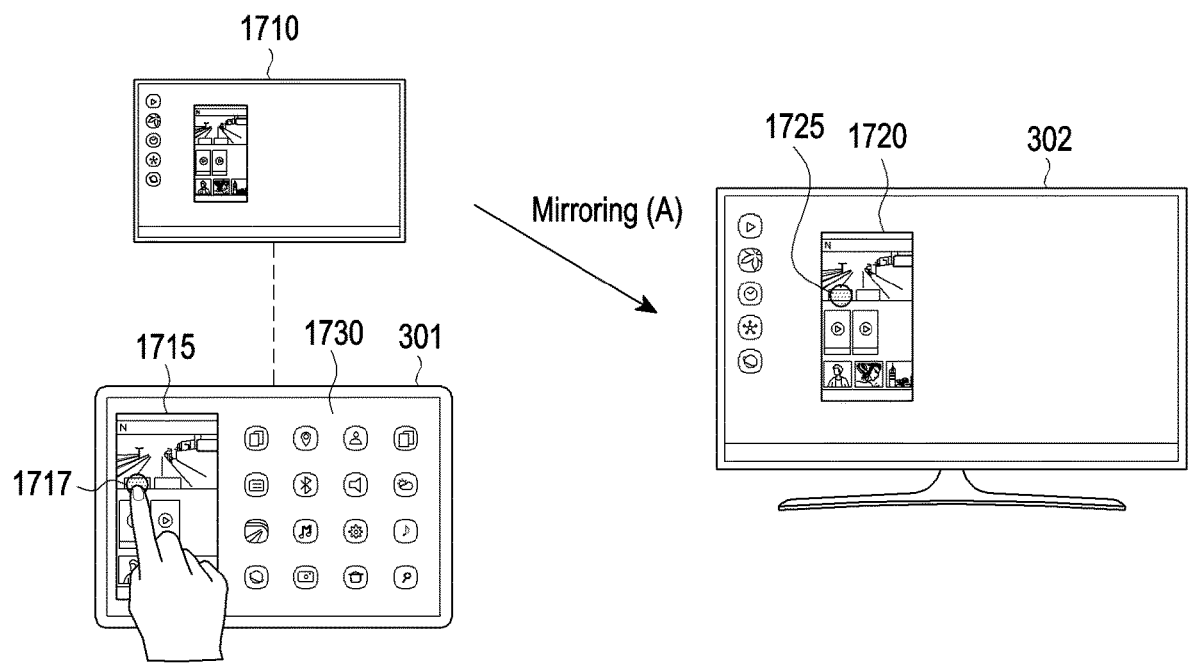
FIG. 17 illustrates a screen for controlling a screen of an external display device by an electronic device according to an embodiment of the disclosure.

FIG. 17 illustrates a screen for controlling a screen of an external display device by an electronic device according to an embodiment of the disclosure.

Referring to FIG. 17, it illustrates a case where a touch view 1715 displaying a focused app of a virtual display 1710 is displayed on a built-in display 1730, and screen data 1720 of the focused app is output via the external display device 302. As one of methods to increase accuracy of a touch input on the touch view 1715, a touch input function for the touch view may be enabled based on an input indicating touch input initiation. According to an embodiment of the disclosure, the input indicating touch input initiation may be a pre-designated touch input. For example, the electronic device 301 may enable a function for touch input recognition when detecting a two-finger touch input or a long-press input in which a touch input is kept for a preconfigured time or longer. For example, the electronic device 301 may use clock information, such as a system clock, to count a duration from a time when a user's hand-based input signal is first received to a time when the signal is no longer received, and accordingly, the electronic device 301 may detect at least one of a touch-based short press, a long press, a single touch, or a multi-touch.

For example, when a touch event 1717 is detected on the touch view 1715, the electronic device 301 may transform coordinates of a position where the touch event has occurred into coordinate values 1730 corresponding to the external display device 302. Accordingly, the external display device 302 may display the position where the touch input has occurred, at a corresponding position by an object, such as an icon. In addition, when a drag occurs subsequent to a touch, coordinates that change in response to the drag may be transformed into coordinate values corresponding to the external display device 302 and transmitted. Therefore, the external display device 302 may update and display the position of the object.

When a touch-up event occurs subsequent to the drag, the electronic device 301 may regard the touch-up event as a click (or selection) event, transform coordinates of a position where the touch-up event has occurred, and transmit the coordinates of the position to the external display device 302. Accordingly, the electronic device 301 may perform a function corresponding to the coordinates where the touch-up event has occurred, display screen data that changes according to performance of the function, and transmit the screen data to the external display device 302. In response to the occurrence of the touch-up event, the external display device 302 may cancel display of an object 1725 in the screen. As described above, by displaying the object 1725 indicating the position of the touch input, a user may be able to identify an accurate position where the touch input has occurred, thereby minimizing touch malfunction.

Figure 18:
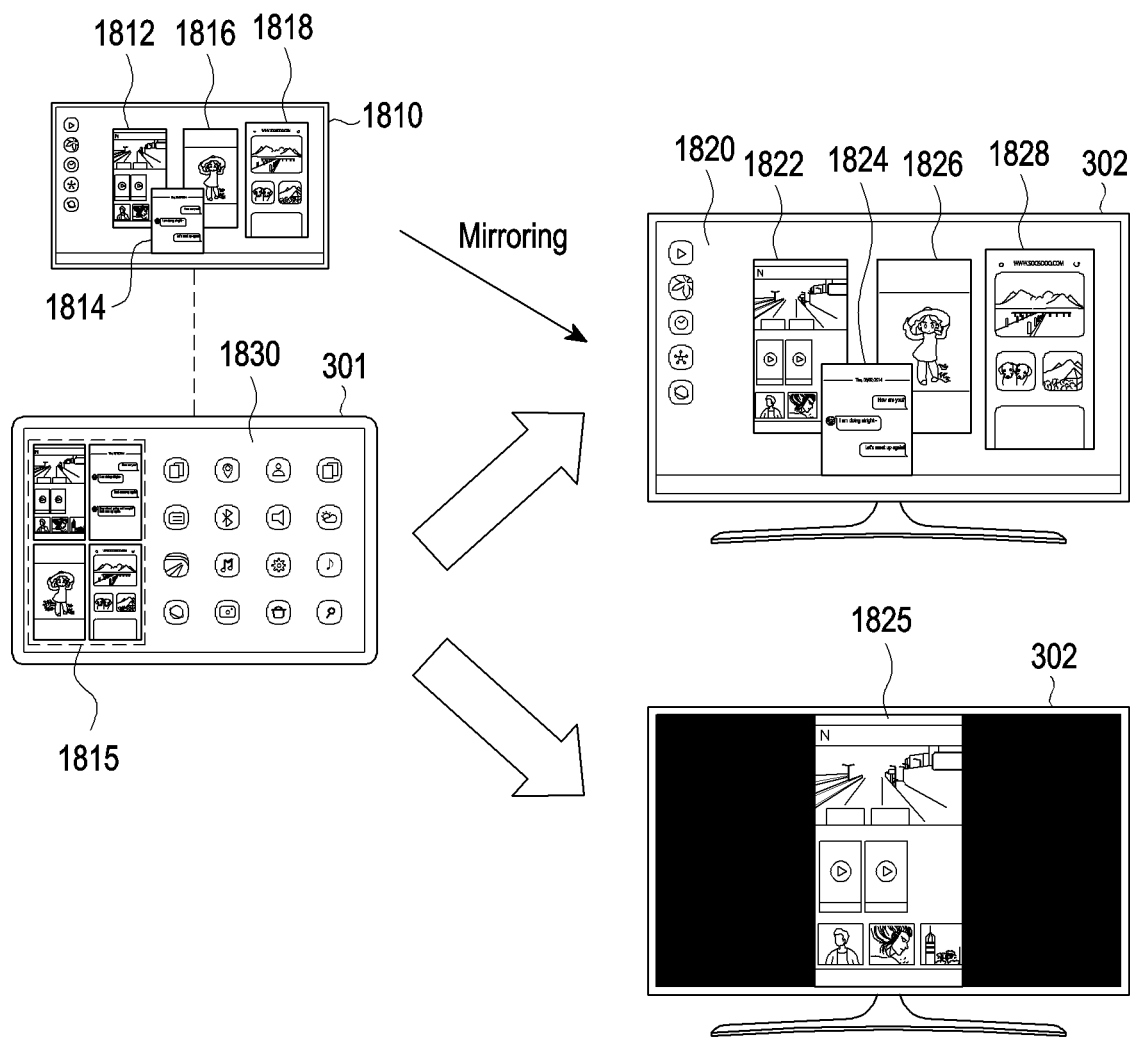
FIG. 18 illustrates a screen for illustrating a method of selecting a focus app from an app list according to an embodiment of the disclosure.

FIG. 18 illustrates a screen for illustrating a method of selecting a focus app from an app list according to an embodiment of the disclosure.

According to various embodiments of the disclosure, the electronic device 301 may provide a function of displaying a list including multiple running applications (or tasks) to facilitate selection of a focus app. An object for displaying the list may be placed in the upper area (or shortcut bar) 721 of the second screen in FIG. 7.

Referring to FIG. 18, the electronic device 301 may output a virtual display 1810 including multiple tasks 1812, 1814, 1816, and 1818 via the external display device 302. The external display device 302 may output a screen 1820 corresponding to the virtual display 1810. The screen 1820 may include multiple tasks 1822, 1824, 1826, and 1828, similar to the virtual display 1810.

According to various embodiments of the disclosure, in response to selection of the object for displaying the list, the electronic device 301 may display a touch view 1815 including multiple tasks on a built-in display 1830. When the object for displaying the list is selected, a list mode for displaying multiple running tasks may be enabled. The electronic device 301, in response to selection of the object for displaying the list, may capture the respective multiple tasks 1822, 1824, 1826, and 1828, and then display the captured tasks as the touch view 1815 in a grid layout. According to an embodiment of the disclosure, when a touch input is made for one task in the touch view 1815, the electronic device 301 may perform switching to a focused task mode, based on the task selected according to the touch input. In response to switching to the focused task mode, only data 1825 of the focused task may be output on the external display device 302.

In the above, descriptions have been provided by taking an example of the case where the respective tasks 1822, 1824, 1826, and 1828 are captured and displayed as the touch view 1815, but the electronic device 301 may display the tasks in the touch view 1815 in the form of respective icons or text, based on information of the tasks 1822, 1824, 1826, and 1828. For example, the electronic device 301 may perform switching to the focused task mode, based on a task corresponding to an icon selected via icon selection in the touch view.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
communication circuitry;
memory storing one or more computer programs; and
one or more processors communicatively coupled to the display, the communication circuitry, and the memory,
wherein the one or more computer programs include computer-executable instructions that, when executed by the one or more processors, cause the electronic device to:
connect to an external display device,
display a first screen on the display of the electronic device,
execute an application via a virtual machine of the electronic device,
transfer, to the external display device, first data related to displaying a second screen of a virtual display of the application executed via of the virtual machine differing from the first screen on the display of the electronic device, such that the second screen of the virtual display of the virtual machine is mirrored on the external display device,
display a third screen corresponding to the second screen of the virtual display, overlapping at least a part of the first screen on the display of the electronic device,
in response to a touch input on the third screen, identify a position where the touch input occurred to a coordinate system of a screen of the external display device,
perform a function corresponding to the position where the touch input has occurred within the second screen of the external display device, and
transmit updated second screen-related second data to the external display device via the communication circuitry.

2. The electronic device of claim 1,
wherein the first screen comprises an object for displaying the third screen, and
wherein the one or more computer programs further include computer-executable instructions that, when executed by the one or more processors, cause the electronic device to, in response to selection of the object, display the third screen corresponding to the second screen, overlapping at least the part of the first screen.

3. The electronic device of claim 1, wherein, during the mirroring, the second screen is not displayed on the first screen.

4. The electronic device of claim 3, wherein the one or more computer programs further include computer-executable instructions that, when executed by the one or more processors, cause the electronic device to:
in response to a request for changing a display orientation of the third screen, display the third screen in a changed display orientation on at least a part of the first screen, and
in response to a touch input on the third screen, perform a function corresponding to a position where the touch input has occurred, based on reference coordinates for the changed display orientation.

5. The electronic device of claim 4, wherein the one or more computer programs further include computer-executable instructions that, when executed by the one or more processors, cause the electronic device to:
acquire the reference coordinates for the changed display orientation,
based on the reference coordinates, transform coordinates of the position where the touch input on the third screen has occurred into coordinates on the second screen, and
perform a function corresponding to the transformed coordinates.

6. The electronic device of claim 1,
wherein the second screen comprises an execution screen of at least one application, and
wherein the third screen corresponds to at least a part of the second screen.

7. The electronic device of claim 6, wherein the one or more computer programs further include computer-executable instructions that, when executed by the one or more processors, cause the electronic device to, in response to selection of one of the at least one application, display a third screen corresponding to the selected application on at least a part of the first screen.

8. The electronic device of claim 7, wherein the one or more computer programs further include computer-executable instructions that, when executed by the one or more processors, cause the electronic device to:
generate an additional virtual display corresponding to the selected application, and
transmit third data related to the selected application so that the third data is mirrored on a display of the external display device by using the generated additional virtual display.

9. The electronic device of claim 7, wherein the one or more computer programs further include computer-executable instructions that, when executed by the one or more processors, cause the electronic device to:
adjust a display orientation and a size of the third screen corresponding to the selected application,
change reference coordinates based on the third screen for which the display orientation and size have been adjusted, and
in case that a touch input is made based on the changed reference coordinates via the third screen corresponding to the selected application, perform a function corresponding to coordinates at which the touch input has occurred.

10. The electronic device of claim 1, wherein the one or more computer programs further include computer-executable instructions that, when executed by the one or more processors, cause the electronic device to:
display the third screen comprising objects indicating respective executable functions related to a display control for at least one of the second screen or the third screen, and
in case that an object indicating a screen fit function is selected from among the objects, change an aspect ratio of the second screen to correspond to an aspect ratio of the external display device.

11. A method performed by an electronic device, the method comprising:
performing connection to an external display device;
displaying a first screen on a display of the electronic device;
executing an application via a virtual machine of the electronic device;
transferring, to the external display device, first data related to displaying a second screen of a virtual display of the application executed via the virtual machine differing from the first screen on the display of the electronic device, such that the second screen of the virtual display of the virtual machine is mirrored on the external display device;

displaying a third screen corresponding to the second screen of the virtual display, overlapping at least a part of the first screen on the display of the electronic device;

in response to a touch input on the third screen, identifying a position where the touch input occurred to a coordinate system of a screen of the external display device;

performing a function corresponding to the position where the touch input has occurred within the second screen of the external display device; and transmitting updated second screen-related second data to the external display device.

12. The method of claim 11, wherein the displaying of the third screen corresponding to the second screen, on at least the part of the first screen comprises, in response to selection of an object for displaying the third screen, displaying the third screen corresponding to the second screen, overlapping at least the part of the first screen.

13. The method of claim 11, wherein, during the mirroring, the second screen is not displayed on the first screen.

14. The method of claim 13, further comprising:

in response to a request for changing a display orientation of the third screen, displaying the third screen in a changed display orientation on at least a part of the first screen; and in response to a touch input on the third screen, performing a function corresponding to a position where the touch input has occurred, based on reference coordinates for the changed display orientation.

15. The method of claim 11, further comprising:

in response to selection of one of at least one application, displaying a third screen corresponding to the selected application on at least a part of the first screen.

16. The method of claim 11, further comprising:

generating an additional virtual display corresponding to the selected application; and transmitting third data related to the selected application so that the third data is mirrored on a display of the external display device by using the generated additional virtual display.

17. The method of claim 15, wherein the second screen comprises an execution screen of the at least one application, and wherein the third screen displays at least a part of the second screen.

18. The method of claim 11, further comprising:

displaying the third screen comprising objects indicating respective executable functions related to a display control for at least one of the second screen or the third screen.

19. One or more non-transitory computer-readable storage media storing computer-executable instructions that, when executed by one or more processors of an electronic device, cause the electronic device to perform operations, the operations comprising:

executing an application via a virtual machine of the electronic device;

performing connection to an external display device;

displaying a first screen on a display of the electronic device;

transferring, to the external display device, first data related to displaying a second screen of a virtual display of the application executed via the virtual machine differing from the first screen on the display of the electronic device, such that the second screen of the virtual display of the virtual machine is mirrored on the external display device;

displaying a third screen corresponding to the second screen of the virtual display, overlapping at least a part of the first screen on the display of the electronic device;

in response to a touch input on the third screen, identifying a position where the touch input occurred to a coordinate system of a screen of the external display device, performing a function corresponding to the position where the touch input has occurred within the second screen of the external display device; and transmitting updated second screen-related second data to the external display device.

20. The one or more non-transitory computer-readable storage media of claim 19, wherein the displaying of the third screen corresponding to the second screen, on at least the part of the first screen comprises, in response to selection of an object which is on the first screen and indicates whether to display the third screen, displaying the third screen corresponding to the second screen, overlapping at least the part of the first screen.

* * * * *